US007080088B1

(12) United States Patent
Lau

(10) Patent No.: US 7,080,088 B1
(45) Date of Patent: Jul. 18, 2006

(54) AUTOMATIC RECONCILIATION OF BINDABLE OBJECTS

(75) Inventor: Kwok Hung Lau, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 580 days.

(21) Appl. No.: 10/354,429

(22) Filed: Jan. 29, 2003

Related U.S. Application Data

(60) Provisional application No. 60/353,796, filed on Jan. 30, 2002.

(51) Int. Cl.
*G06F 17/30* (2006.01)
*G06F 15/173* (2006.01)
*G06F 9/44* (2006.01)

(52) U.S. Cl. ............... 707/101; 707/6; 707/10; 707/102; 709/223; 717/103

(58) Field of Classification Search .......... 707/2, 707/3, 4, 5, 6, 10, 101, 102; 705/1; 709/223; 715/503, 704, 764; 717/113, 125, 103
See application file for complete search history.

(56) References Cited

U.S. PATENT DOCUMENTS 6,370,573 B1 * 4/2002 Bowman-Amuah ......... 709/223
6,407,753 B1 * 6/2002 Budinsky et al. ............ 715/764
6,694,310 B1 * 2/2004 Yu et al. ........................ 707/4
6,721,713 B1 * 4/2004 Guheen et al. ................ 705/1
2003/0050932 A1 * 3/2003 Pace et al. .................. 707/100

* cited by examiner

Primary Examiner—Shahid Alam
(74) Attorney, Agent, or Firm—Hickman Palermo Truong & Becker LLP; Marcel K. Bingham

(57) ABSTRACT

Described herein is a reconciliation mechanism that facilitates reconciliation of deployment environments and dataflow descriptions. A dataflow description describes a dataflow, from which a code implementation can be generated for execution on one or more database systems, referred to as a deployment environment. To generate an implementation for a deployment environment, the elements of a dataflow description are bounded to the elements of a deployment environment. The elements of a deployment environment may change, which in turn may require changes to elements of a dataflow description that are bounded to the changed elements of the deployment environment. The reconciliation mechanism may be used to ascertain the differences between the dataflow description and the deployment environment and facilitate propagation of differences to either. The reconciliation mechanism may also be applied in other contexts, and in fact may be used to establish a binding between any sets of bindable objects.

32 Claims, 13 Drawing Sheets

FIG. 3A

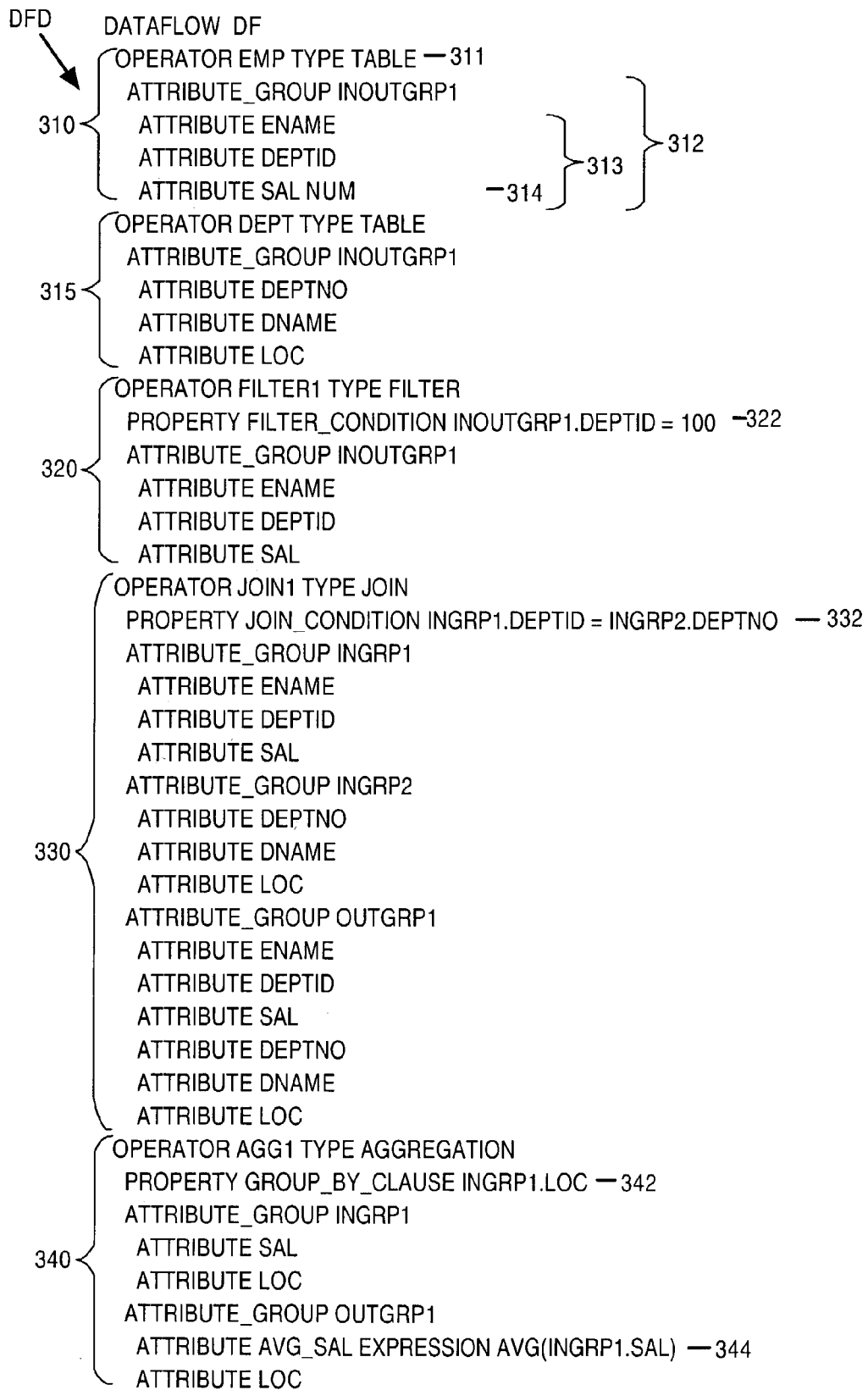

```
DFD      DATAFLOW DF
  ↘       ⎧ OPERATOR EMP TYPE TABLE  ─311
          ⎪   ATTRIBUTE_GROUP INOUTGRP1                ⎫
   310 ⎨       ATTRIBUTE ENAME                         ⎬─312
          ⎪     ATTRIBUTE DEPTID              ⎬─313
          ⎩     ATTRIBUTE SAL NUM      ─314 ⎭

⎧ OPERATOR DEPT TYPE TABLE
          ⎪   ATTRIBUTE_GROUP INOUTGRP1
   315 ⎨       ATTRIBUTE DEPTNO
          ⎪     ATTRIBUTE DNAME
          ⎩     ATTRIBUTE LOC

⎧ OPERATOR FILTER1 TYPE FILTER
          ⎪   PROPERTY FILTER_CONDITION INOUTGRP1.DEPTID = 100  ─322
   320 ⎨   ATTRIBUTE_GROUP INOUTGRP1
          ⎪     ATTRIBUTE ENAME
          ⎪     ATTRIBUTE DEPTID
          ⎩     ATTRIBUTE SAL

⎧ OPERATOR JOIN1 TYPE JOIN
          ⎪   PROPERTY JOIN_CONDITION INGRP1.DEPTID = INGRP2.DEPTNO  ─332
          ⎪   ATTRIBUTE_GROUP INGRP1
          ⎪     ATTRIBUTE ENAME
          ⎪     ATTRIBUTE DEPTID
          ⎪     ATTRIBUTE SAL
          ⎪   ATTRIBUTE_GROUP INGRP2
          ⎪     ATTRIBUTE DEPTNO
   330 ⎨     ATTRIBUTE DNAME
          ⎪     ATTRIBUTE LOC
          ⎪   ATTRIBUTE_GROUP OUTGRP1
          ⎪     ATTRIBUTE ENAME
          ⎪     ATTRIBUTE DEPTID
          ⎪     ATTRIBUTE SAL
          ⎪     ATTRIBUTE DEPTNO
          ⎪     ATTRIBUTE DNAME
          ⎩     ATTRIBUTE LOC

⎧ OPERATOR AGG1 TYPE AGGREGATION
          ⎪   PROPERTY GROUP_BY_CLAUSE INGRP1.LOC  ─342
          ⎪   ATTRIBUTE_GROUP INGRP1
   340 ⎨     ATTRIBUTE SAL
          ⎪     ATTRIBUTE LOC
          ⎪   ATTRIBUTE_GROUP OUTGRP1
          ⎪     ATTRIBUTE AVG_SAL EXPRESSION AVG(INGRP1.SAL)  ─344
          ⎩     ATTRIBUTE LOC
```

FIG. 3B

```
         ┌ OPERATOR USD_TO_ECU_EXP TYPE EXPRESSION ── 346
         │   ATTRIBUTE_GROUP INGRP1
         │     ATTRIBUTE AVG_SAL
         │   ATTRIBUTE_GROUP OUTGRP1
  345 ⎰  │     ATTRIBUTE AVG_SAL_ECU EXPRESSION INGRP1.AVG_SAL * 1.08
         │ OPERATOR AVG_SAL_T TYPE TABLE
         │   PROPERTY LOADING_TYPE INSERT
         │   ATTRIBUTE_GROUP INOUTGRP1
         │     ATTRIBUTE AVG_SAL
         └     ATTRIBUTE LOC
```

CONNECTION FROM EMP.INOUTGRP1.ENAME TO — 362
    FILTER1.INOUTGRP1.ENAME
CONNECTION FROM EMP.INOUTGRP1.DEPTNO TO —363
    FILTER1.INOUTGRP1.DEPTNO
CONNECTION FROM EMP.INOUTGRP1.DEPTID TO —364
    FILTER1.INOUTGRP1.DEPTID
CONNECTION FROM FILTER1.INOUTGRP1.ENAME TO
    JOIN1.INGRP1.ENAME
CONNECTION FROM FILTER1.INOUTGRP1.DEPTID TO
    JOIN1.INGRP1.DEPTID
CONNECTION FROM FILTER1.INOUTGRP1.SAL TO
    JOIN1.INGRP1.SAL

MAPPINGS 360

CONNECTION FROM DEPT.INOUTGRP1.DEPTNO TO
    JOIN1.INGRP2.DEPTNO
CONNECTION FROM DEPT.INOUTGRP1.DNAME TO
    JOIN1.INGRP2.DNAME
CONNECTION FROM DEPT.INOUTGRP1.LOC TO
    JOIN1.INGRP2.LOC
CONNECTION FROM JOIN1.OUTGRP1.SAL TO
    AGG1.INGRP1.SAL
CONNECTION FROM JOIN1.OUTGRP1.LOC TO
    AGG1.INGRP1.LOC

CONNECTION FROM AGG1.OUTGRP1.AVG_SAL TO
    USD_TO_ECU.INGRP1.AVG_SAL
CONNECTION FROM AGG1.OUTGRP1.LOC TO
    AVG_SAL_T.INOUTGRP1.LOC
CONNECTION FROM USD_TO_EDU.OUTGRAPH1.AVG_SAL_ECU TO
    AVG_SAL_T.INOUTGRP1.AVG_SAL

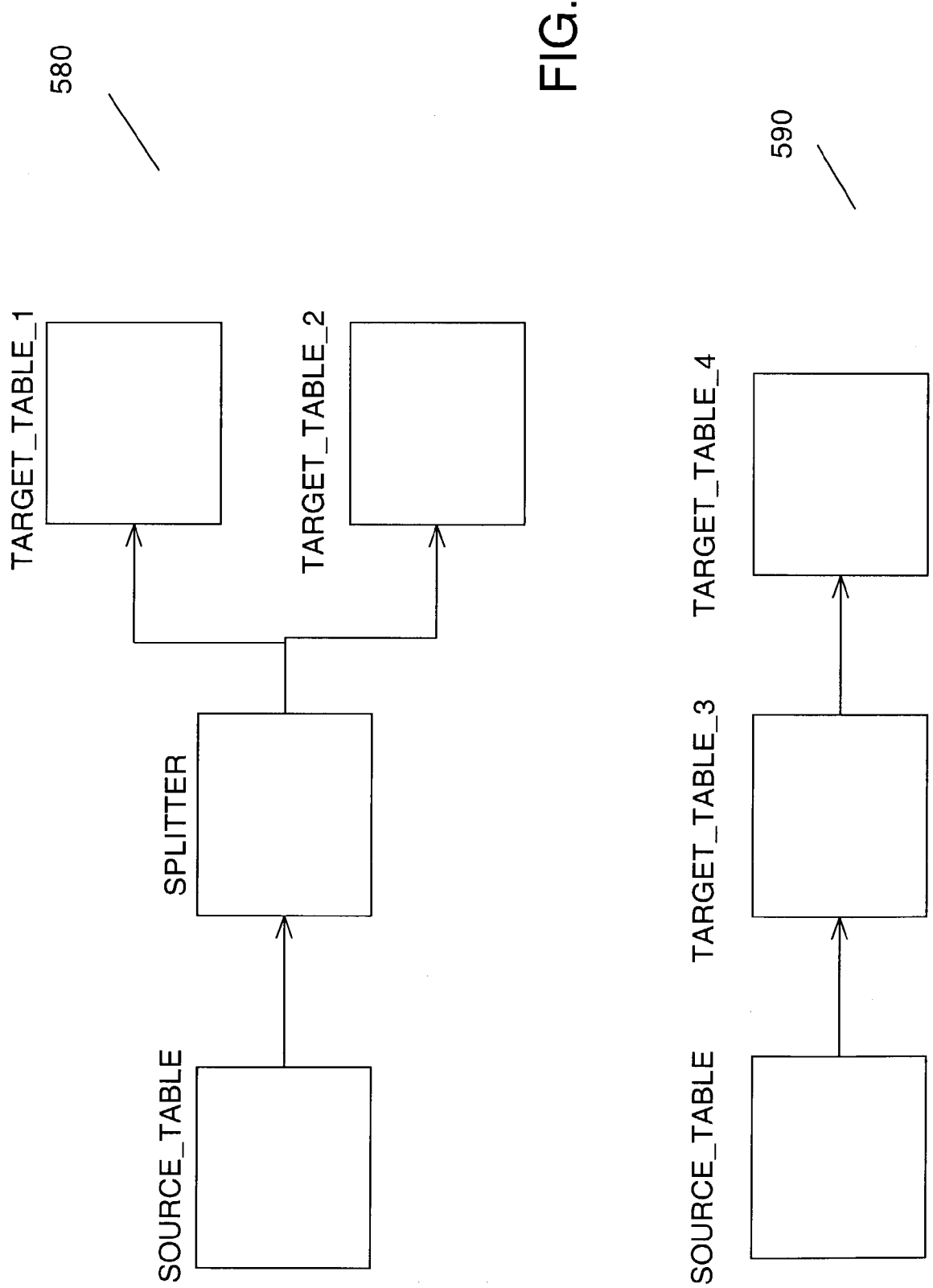

```
DECLARE
CURSOR AGG1_CUR IS
SELECT INLINE_VIEW1.AVG_SAL AVG_SAL, INLINE_VIEW1.LOC LOC
FROM
  (SELECT AVG(EMP.SAL) AVG_SAL, DEPT.LOC LOC
  FROM EMP, DEPT
  WHERE EMP.DEPTID = 100
  AND EMP.DEPTID = DEPT.DEPTNO
  GROUP BY DEPT.LOC) INLINE_VIEW1
AGG1_AVG_SAL NUMBER;
AGG1_LOC VARCHAR2(13);
USD_TO_ECU_EXP_AVG_SAL_EDU NUMBER;
BEGIN
  OPEN AGG1_CUR;
  LOOP
    FETCH AGG1_CUR INTO AGG1_AVG_SAL, AGG1_LOC;;
    EXIT WHEN AGG1_CUR%NOTFOUND;
    USD_TO_ECU_EXP_AVG_SAL_ECU := AGG1_AVG_SAL * 1.08;
  END LOOP;
  CLOSE AGG1_CUR;
END;
```
— 635

```
DECLARE
CURSOR AGG1_CUR IS
SELECT INLINE_VIEW1.AVG_SAL AVG_SAL, INLINE_VIEW1.LOC LOC
FROM
  (SELECT AVG(EMP.SAL) AVG_SAL, DEPT.LOC LOC
  FROM EMP, DEPT
  WHERE EMP.DEPTID = 100
  AND EMP.DEPTID = DEPT.DEPTNO
  GROUP BY DEPT.LOC) INLINE_VIEW1
AGG1_AVG_SAL NUMBER;
AGG1_LOC VARCHAR2(13);
USD_TO_ECU_EXP_AVG_SAL_ECU NUMBER;
BEGIN
  OPEN AGG1_CUR;
  LOOP
    FETCH AGG1_CUR INTO AGG1_AVG_SAL, AGG1_LOC;
    EXIT WHEN AGG1_CUR%NOTFOUND;
    USD_TO_ECU_EXP_AVG_SAL_ECU := AGG1_AVG_SAL * 1.08;
    INSERT INTO AVG_SAL_T (AVG_SAL, LOC)
    VALUES (USD_TO_ECU_EXP_AVG_SAL_ECU, AGG1_LOC);
  END LOOP;
  CLOSE AGG1_CUR;
END;
```
— 640

FIG. 6C

AUTOMATIC RECONCILIATION OF BINDABLE OBJECTS

RELATED INVENTION

The present application claims priority to U.S. Provisional Application No. 60/353,796, entitled Operator Approach for Data Flow Design, filed by Kwok Hung Lau and Ali El Kortobi on Jan. 30, 2002, the contents of which are hereby incorporated herein by reference.

FIELD OF THE INVENTION

The present invention relates to database systems, and in particular, database design mechanisms and methods.

BACKGROUND OF THE INVENTION

A data warehouse represents the result of a transformation of raw data from an organization's data sources into a database that is accessible for query and analysis. Typically, data is moved from a source database into a data warehouse in three stages: extraction of data from the source database, transformation of the extracted data, and loading of the transformed data into the data warehouse. These stages are referred to collectively as ETL, which stands for extraction, transformation, and loading. A database may be a relational database, an object-relational database, or a set of flat files. For example, a source database may be an online transaction processing (OLTP) system that is oriented towards the "real time" operation of a business. The data is extracted from the OLTP source database, transformed, and loaded in a data warehouse. The transformed data in the data warehouse may be used by an online analytical processing (OLAP) system that can answer longer range, management-oriented questions about the business.

ETL development tools are software tools that are used to extract, transform, and load data into data warehouses. Conventional ETL development tools consist of a variety of components, including a data movement planner and data movement engine. A data movement planner generates data movement plans. Data movement plans include ETL components that define ETL operations. ETL components include extraction components, which define an extraction operation from a source database, and transformation components, which define operations like join, aggregation, and filter. A data movement engine executes the data movement plan.

An advantage of a data movement plan is that they may be represented graphically as a data movement graph that consists of interconnected icons representing ETL components. Such data movement graphs help a user to visualize a data movement plan, greatly improving the users ability to unravel and understand the complexity of data movement plans. Once the user has entered input defining the data movement plan, the data movement planner generates the data movement plan.

ETL development tools have various drawbacks that stem from the fact that they are based on a paradigm that requires that the data movement engine be a different system than the source database system and/or data warehouse and that imposes a dichotomous treatment of the extraction and loading components. Under this paradigm, the data movement engine must interact with another database system to perform operations for the extraction and/or loading components.

Furthermore, the extraction component is treated as a black box, a simple query (source query) not to be modified but to be simply provided to the source database system for execution. The source query is provided and designed by a user, and conforms to a native database language that is supported by the source database system. When a data movement plan is executed, the data movement engine submits the source query to the source database system. In response, the source database system computes the source query and supplies the results to the data movement engine. The results serve as input to the remainder of the execution of the data movement plan.

Once the engine transforms the data, the data is loaded into a data warehouse. Because the data movement engine and data warehouse are different systems, the transformed data is transferred to the data warehouse, which then loads the transformed data.

A major drawback suffered under this paradigm is that the data movement engines ability to optimize data movement plans is substantially impaired for several reasons. First, data movement engines lack access to information that is needed for optimization. This information includes, for example, statistics on tables and the number of rows currently in the source tables. Typically, a source database system has this sort of information. Even if a data movement engine has access to the information, it does not use the information to optimize data movement plans.

Second, because the extraction component is treated as a black box to be executed by the source database system, the data movement engine cannot push the execution of some operations defined by a transform component to the source system, causing the source database system, data movement engine, and data warehouse to perform wasteful work. For example, a data movement plan defines a transform component in the form of a filter operation. It is more efficient to push the filter operation to the source database system by adding a filter to the source query. However, because the data movement engine treats the extraction component as a black box which cannot modified but must simply be provided to the source database system for execution, the source database system executes the source query and extracts data that does not satisfy the filter's criteria. The data movement engine applies the filter only after the source database system extracts data. Thus, work is wasted extracting and transporting over a computer network data that does satisfy the filter condition and that could never be moved to the target database system.

To compensate for this inability to optimize data movement plans, the user must manually optimize the execution of the data movement plan by defining the extraction component to include operations that would otherwise be defined by certain transform operations. For example, a data movement plan includes a join and aggregation operation, among other operations. So that the join and aggregation operations may be executed more efficiently, the user creates a source query that specifies these operations, causing them to be performed by the source database system. The user intentionally foregoes defining transformation components in the data movement plan that perform the join and aggregate operations in the extraction component, so that the operations are not performed by the data movement engine and are instead left to be performed by the source database system.

While this strategy may work, it has disadvantages. First, the strategy requires the greater skill and effort needed to program more complex source queries. The strategy also deprives the user of the substantial benefits of using the computer aided design functions available for defining ETL components.

Finally, source database systems change. Many of the changes must be propagated to data movement plans. Propagating the changes may entail examining the code previously entered for ETL components—a manual process which can be very cumbersome and expensive.

Based on the foregoing, it is desirable to provide a mechanism that may be used to implement movement plans that avoid the various drawbacks attendant conventional ETL systems.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 3A and 3B are diagrams depicting a dataflow description according to an embodiment of the present invention.

FIG. 5B is a dataflow graph according to an embodiment of the present invention.

FIGS. 6A, 6B, and 6C are diagrams depicting generation contexts showing how a code implementation for a dataflow graph evolves during code generation according to an embodiment of the present invention.

DETAILED DESCRIPTION OF THE INVENTION

Figure 1:
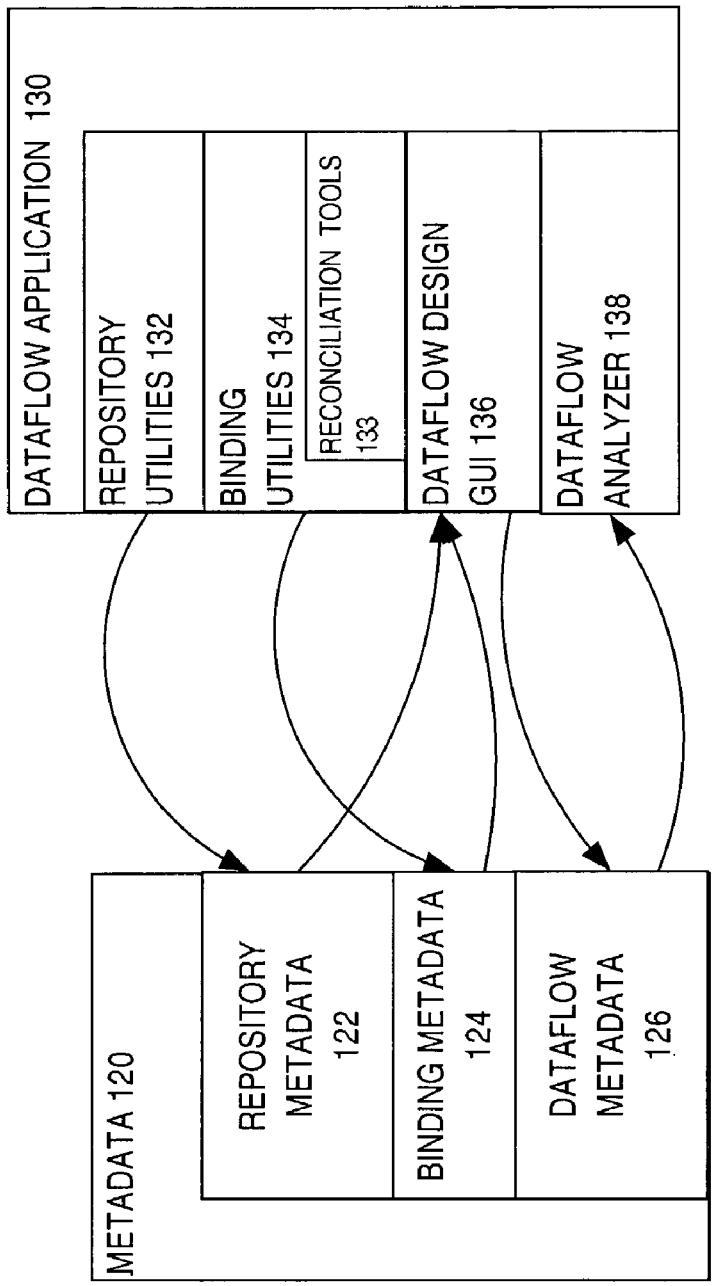
FIG. 1 is a block diagram depicting a dataflow design system architecture according to an embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

OVERVIEW

Described herein is an operator-based approach to representing dataflows. A dataflow is a set of one or more operations and one or more flows of data that are processed successively by the set of operations. Dataflow processes commonly occur in many environments. For example, in a relational database system, a dataflow process may be the generation of the results of a query. Such a dataflow consists of a retrieval operation for retrieving data, followed by a filtering operation for filtering data that satisfies a particular criteria. The output data generated by the retrieval operation is the input to the filter operation. In this way, data flows from the retrieval operation to the filter operation.

Dataflows may be described in many computer languages, including SQL. According to the operator-based approach, however, a dataflow is described by a generic description in which operations in a dataflow are represented by operators. An operator defines a primitive operation (e.g. join, filter), specifying not only the type of operation, but the inputs and outputs, rules, and criteria that govern the operation. In addition, the generic description completely describes how data is processed by a dataflow, from the dataflow's source to its destination. No portion of the dataflow need be described by a source query defined by a user for the extraction component, as is done under previously described paradigm that imposes the dichotomous treatment of the extracting and loading components.

From the generic description, a code implementation is generated that may be completely executed on a source database system and target data warehouse, without need for an intermediate system to participate in the execution of the code implementation, such as a data movement engine. The one or more database systems in which a code implementation is executed, in whole or in part, are herein referred to as a deployment environment. The advantage of this approach is that the code implementation may be executed by fewer database systems, reducing the need to transfer data between different systems and the attendant overhead.

Furthermore, the code implementation is executed on database systems that have the ability to optimize execution of the code implementation. For example, the code implementation can be deployed to a target data warehouse, which pushes a portion of the execution of the code implementation to the source database system. A native query optimization mechanism on the target data warehouse decides what portion should be performed by the source database system. These mechanisms use information, such as statistics on tables and the number of rows currently in the source tables, to determine how to optimally execute a code implementation.

The generic description is not tied to any particular computer language. The advantage of this approach is that it is easier to develop software tools for creating and optimizing dataflows, where the software tools only need to be programmed for one common format for describing a dataflow, rather than having to be programmed for a multitude of formats or computer languages for describing a dataflow. Finally, because the generic description completely describes the operations performed, all aspects of the operations may be examined and analyzed to optimize a dataflow. The generic description can express aspects about a primitive operation that could not be previously expressed by a conventional computer language, or that were difficult to discern from the description written in the computer language.

The operation defined by an operator accepts as input and generates as output one or more sets of rows referred to herein as "rowsets". A row is one or more ordered fields, each of the fields having a value of a certain data type. A rowset is a collection of zero or more rows, where each row has the same number of fields and the data type is the same for all fields in the rowset in the same respective ordinal position within a row.

To generate an implementation for a deployment environment, the elements of a dataflow description are bounded to the elements of a deployment environment. For example, the fields of a rowset defined for an operator are bound to columns of a table in a source database system. The elements of a deployment environment may change, which in turn may require changes to elements of a dataflow description bounded to the changed elements of the deployment environment. Described herein is a reconciliation mechanism that facilitates reconciliation of deployment environments and dataflow descriptions. The reconciliation mechanism may also be applied in other contexts as well.

An objective and advantage of the reconciliation process described herein is to decouple the evolution of the deployment environment from the evolution of the dataflows. The deployment environment and dataflows may be developed independently and asynchronously. Changes made to the deployment environment do not need to be immediately propagated to the dataflow. The changes can be validated and tested before propagating them through the reconciliation process.

In addition, changes to data flows may be commenced without the need to propagate changes from a deployment environment, or even before defining the deployment environment. The availability of the reconciliation mechanism reduces or eliminates the need to immediately propagate the changes made to a dataflow to the deployment environment.

ILLUSTRATIVE DATAFLOW DESIGN SYSTEM

FIG. 1 depicts dataflow design system 101 according to an embodiment of the present invention. System 101 includes dataflow application 130, which comprises application components for creating and modifying dataflow metadata 126 within metadata 120. Dataflow metadata 126 describes dataflows. Dataflow metadata 126 includes one or more dataflow descriptions, each of which define and represent a particular dataflow.

Dataflow design GUI 136 is a GUI that enables and facilitates the generation of a dataflow description. To visually represent a dataflow and a dataflow description, dataflow design GUI 136 generates graphical displays depicting graphical components that represent elements of a dataflow description. The user, through click, drag, and drop operations, can manipulate the icons to construct a graphical representation of the dataflow. Based on the input provided in this manner, the dataflow design GUI 136 generates a dataflow description.

Dataflow analyzer 138 is a software component that analyzes a dataflow to generate code implementations that implement the dataflow. The code generated in a particular computer language, or a version of the computer language, is referred to as a code implementation. The computer language for a code implementation may be selected by a user, or by the dataflow analyzer, which selects the language based on a variety of considerations, including which language is optimal for implementing the dataflow in the particular deployment environment in which the code implementation will be run. For example, information provided by the user through dataflow design GUI 136 indicates that the code implementation for a dataflow is to be run on a particular version of a database system. Based on this information, the dataflow analyzer generates a code implementation that incorporates a new language feature, not recognized by earlier versions of the database system, that allows the code implementation to be run more efficiently than a code implementation without the feature. If the user had indicated that the code implementation was to be executed on an earlier version of the database system, then the dataflow analyzer would have generated a code implementation without the new language feature.

In an embodiment, a user specifies a deployment language and a "code generation strategy" through GUI 136. The deployment language is a language used for a code implementation that can be installed on a deployment environment. Some deployment languages allow a code implementation to embed code of another language. Such code implementations thus include multiple languages. The code generation strategies that are available for selection by a user depend on the deployment language selected. The dataflow analyzer attempts to generate the code according to the selected code generation strategy.

Alternatively, the dataflow analyzer attempts to generate code according to all the code generation strategies available for a deployment language, generating a separate code implementation for each strategy. The separate code implementations are packaged together as a deployable bundle for execution in the deployment environment. At runtime only one of the bundled code implementations is executed. A user-configurable switch is used to control which one of them is executed. Different code generation strategies, and how they affect the generation of a code implementation, shall be later described. A particular code implementation may constitute several sets of code generated in different computer languages. For example, a code implementation may contain a portion that conforms to SQL, and a portion that conforms to PL/SQL, a database access language supported and promulgated by Oracle Corporation. In addition, multiple code implementations may be generated for a dataflow. For example, for a dataflow for which multiple code implementations are generated, one code implementation is an SQL statement that defines operations for extracting data that is loaded into a target table, another code implementation is another SQL statement that defines operations for extracting data from that target table and loading the extracted data into another table.

A dataflow may involve data that flows from a source database to a target database. To create representations of such dataflows, a description of the data in the source or target database is needed. Repository metadata 122 is metadata that describes data in a source or target database, defining such entities as database tables, columns in the tables and their data types, indexes that index tables, the fields of records in a file, and delimiters that delineate the fields and records. A database described by repository metadata 122 is referred to herein as a described database. Database entities defined by repository metadata 122 are referred to as repository entities. Repository objects within repository metadata 122 describe a particular repository entity.

In an embodiment, repository metadata 122 is not simply a mere identical copy of the metadata maintained by database systems or applications that describes source and target databases. Repository metadata 122 is a distinct body of metadata, having a form useable by dataflow design system 101. Repository metadata 122 is created and maintained through use of repository utilities 132. Repository utilities 132 are software tools for creating and modifying repository metadata 122. Repository utilities 132 may include any of the following: a GUI interface that enables a user to define database entities in a source or target database, and that updates repository metadata 122 to reflect the definition; a database metadata extractor that extracts metadata from a source or target database, and that converts the metadata into a form stored in repository metadata 122.

Binding metadata 124 is metadata that correlates elements of a dataflow description to the repository entities of a described database. When binding metadata 124 correlates the elements of a dataflow description in this way, both the dataflow and its description are referred to herein as being bounded to that described database. A dataflow description, once bounded to a repository entity, may be used by dataflow analyzer 138 to generate a code implementation that operates upon the repository entity. It is, however, not necessary that a dataflow representation be bounded for dataflow analyzer 138 to generate a code implementation for the dataflow description.

Binding metadata 124 is generated through use of binding utilities 134. These utilities include a GUI interface for visually binding elements of a dataflow to a described database. A described database may change, which in turn, may require changes to a dataflow. A reconciliation tool 133 facilitates the process of propagating changes to a dataflow representation required by changes to a described database.

ILLUSTRATIVE DATAFLOW GRAPH

Figure 2:
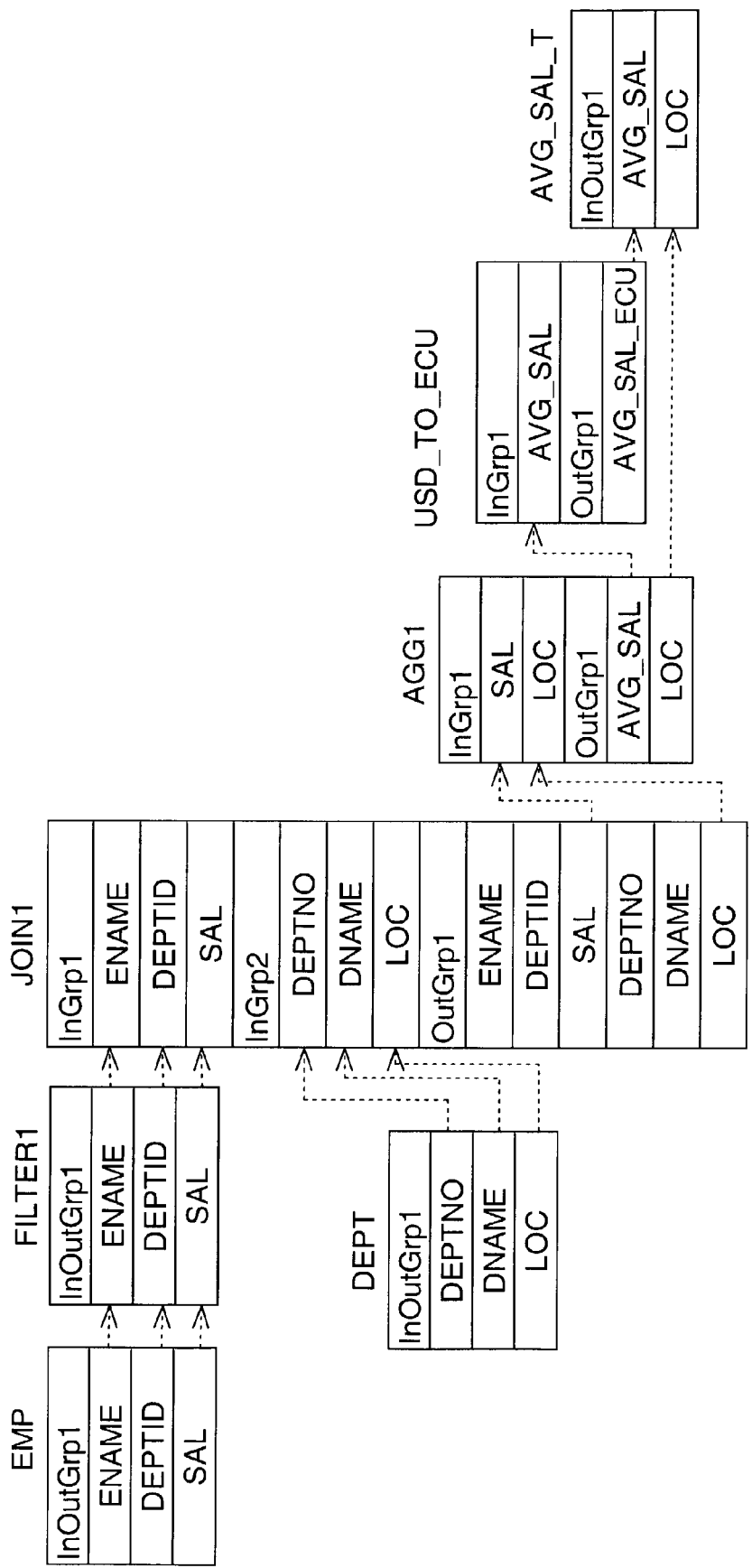
FIG. 2 is a dataflow graph according to an embodiment of the present invention.

FIG. 2 depicts dataflow graph DF. A dataflow graph, such as dataflow graph DF, represents a dataflow using operators and attribute groups associated with the operators. An attribute group defines the structure of a rowset that is an input or output of the operation defined by an operator.

Selected elements (e.g. operators) of dataflow graph DF are used to herein illustrate various concepts concerning dataflows and dataflow graphs. After illustrating these concepts, other elements in dataflow graph DF are described in greater detail.

Referring to FIG. 2, its depicts operators JOIN1, and its associated attribute group, InGrp1, InGrp2, and OutGrp1. It should be noted that other operators depicted in FIG. 2 have identically named attribute groups. For example, AGG1 and AVG_SAL_T each have an attribute identified as InGrp1. To distinguish between identically labeled attribute groups, a notation that specifies the operator of the attribute group is used to refer the attribute group. The notation has the following form: operator-name.attribute-group-name. Thus, "JOIN1.InGrp1" and "JOIN1.InGrp2" refer to the attribute groups of JOIN1. When it is clear from the context which attribute group is being referred to, the notation may not be used.

An attribute group, such as JOIN1.InGrp1, contains an ordered set of attributes. JOIN1.InGrp1 contains attributes ENAME, DEPTID, and SAL. Attributes may be referred to using a notation, similar to that used for attribute groups, that refers to the attribute group of the attribute. For example, JOIN1.InGrp1.ENAME refers to the attribute ENAME within JOIN1.InGrp1.

An attribute is a "placeholder" of a certain data type within an attribute group. An attribute has a direction. The direction specifies whether an attribute defines an input, output, or both of an operator. The direction of an attribute is identified herein as either input, output, or input/output. An input/output attribute may be referred to as an input, output, or input/output attribute. The attributes of an attribute group have the same direction. The direction of an attribute group is that of its attributes. For example, the direction of "JOIN1.InGrp1", and its attributes, ENAME, DEPTID, SAL, is input.

An input attribute group of an operator defines a structure for the rowset that is an input to the operation defined by the operator. A rowset and the rows therein whose structure is defined by an input attribute group of an operator are referred to as an input rowset or input row with respect to the operator.

An output attribute group of an operator defines the structure for a rowset that is the output of the operation defined by an operator. The rowset and the rows therein whose structure is defined by an output attribute group of an operator are referred to as the output rowset or output rows with respect to the operator.

Dataflow graph DF does not depict all aspects of operators shown in dataflow graph DF. For example, dataflow graph DF depicts JOIN1, which defines a join operation which is not explicitly depicted in dataflow graph DF. The join condition is, however, defined by the metadata that describes dataflow graph DF. According to an embodiment of the present invention, the metadata that defines dataflow graph DF conforms to a generic dataflow language, which shall be later described in greater detail.

ATTRIBUTE AND ATTRIBUTE GROUP MAPPINGS

For a pair of operators, a dataflow graph DF may map an attribute of the output attribute group of an "upstream operator" to an attribute of an input attribute group of a "downstream operator". The attribute of an output attribute group mapped in this way is referred as a "upstream attribute"; the output attribute group is referred to as an "upstream attribute group". Similarly, the attribute of the input attribute group mapped in this way is referred to as a "downstream attribute"; the input attribute group is referred to as an "downstream attribute group". A downstream operator is referred to as being mapped to an upstream operator if at least one of the attributes in the downstream operator is mapped to an attribute in the upstream operator. Mapping a downstream attribute group from an upstream attribute group specifies that the output rowset defined by the upstream attribute group is a source for an input rowset defined for the downstream attribute group. The mapping between the downstream attributes and the upstream attributes specifies what fields in their respective input rowset correspond to what fields in the respective output rowset.

For example, FILTER1.InOutGrp1 is the upstream group for downstream group JOIN1.InGrp1. FILTER1.InOutGrp1.ENAME is the upstream attribute for downstream attribute JOIN1.InGrp1.ENAME. The attributes of the output rows defined by FILTER1.InOutGrp1.ENAME correspond to the attributes of the input rows defined for JOIN1.InGrp1.ENAME.

Remaining Elements in the Illustrative Dataflow Graph

Referring again to FIG. 2, operator EMP is a table source operator. A source operator represents an operation that extracts records from a source database, e.g. rows and columns from a table in a source database.

EMP.InOutGrp1 is defined as the input/output attribute group for EMP. The attributes of EMP are EMP.InOutGrp1.ENAME, EMP.InOutGrp1.DEPTID, and EMP.InOutGrp1.SAL.

Binding metadata in binding metadata 124 may link attributes of the source operator's attribute group to repository entities defined by repository metadata 122, thereby binding the dataflow graph DF, operator EMP, attribute group InOutGrp1 and its attributes to the source database, the table in the source database, and the columns in the table. It should be noted that a source operator may be defined for a dataflow graph without having to bind the source operator.

FILTER1 is the downstream operator of EMP. FILTER1 is an example of an operator defining a filter operation. The filter operation filters in rows in a rowset that satisfy one or more criteria based on one or more fields. The criteria, while not depicted in FIG. 2, is defined by the dataflow metadata later described.

FILTER1.InOutGrp1 is defined as the input/output attribute group for FILTER1. The attributes of FILTER1.InOutGrp1 are FILTER1.InOutGrp1.ENAME, FILTER1.InOutGrp1.DEPTID, and FILTER1.InOutGrp1.SAL. EMP.InOutGrp1.ENAME, EMP.InOutGrp1.DEPTID, and EMP.InOutGrp1.SAL are mapped as upstream attributes to downstream attributes FILTER1.InOutGrp1.ENAME, FILTER1.InOutGrp1.DEPTID, and FILTER1.InOutGrp1.SAL.

DEPT is also a source operator. DEPT.InOutGrp1 is defined as the input/output attribute group for DEPT. The attributes of DEPT.InOutGrp1 are DEPT.InOutGrp1.DEPTNO, DEPT.InOutGrp1.DNAME, and DEPT.InOutGrp1.LOC.

JOIN1, as mentioned before, defines a join operation (the join condition is defined by dataflow metadata). Accordingly, JOIN1 has two input attribute groups, representing two input rowsets for the join operation. The input attribute groups are JOIN1.InGrp1 and JOIN1.InGrp2. The attributes of JOIN1.InGrp1 are JOIN1.InGrp1.ENAME, JOIN1.InGrp1.DEPTID, and JOIN1.InGrp1.SAL. The attributes of JOIN1.InGrp2 are JOIN1.InGrp2.DEPTNO, JOIN1.InGrp2.DNAME, and JOIN1.InGrp2.LOC.

FILTER 1.InOutGrp1.ENAME, FILTER1.InOutGrp1.DEPTID, and FILTER1.InOutGrp1.SAL are mapped as upstream attributes to downstream attributes JOIN1.InGrp1.ENAME, JOIN1.InGrp1.DEPTID, and JOIN1.InGrp1.SAL, respectively. DEPT.InOutGrp1.DEPTNO, DEPT.InOutGrp1.DNAME, and DEPT.InOutGrp1.LOC are mapped as upstream attributes to downstream attributes JOIN1.InGrp2.DEPTNO, JOIN1.InGrp2.DNAME, and JOIN1.InGrp2.LOC.

JOIN1 is the upstream operator to AGG1. AGG1 is an aggregate operator because it defines an aggregation operation. An aggregation operation generates an output row that contains an aggregate value which is generated by applying an aggregate function (e.g. SUM, COUNT, or AVERAGE) to values in a field of a group of input rows. The input attribute group of AGG1 is AGG1.InGrp1, which includes attributes AGG1.InGrp1.SAL and AGG1.InGrp1.LOC. The output attribute group for AGG1 is AGG1.OutGrp1, which includes AGG1.OutGrp1.AVG_SAL and AGG1.OutGrp1.LOC.

The particular aggregate operation defined by AGG1 is to generate the average of the values in SAL for all rows in the input rowset that have the same value in the LOC. The output generated by the operator is a rowset with rows that contain an average salary value in AVG_SAL for a particular value in LOC.

As mentioned before, operators define an operation that have a rowset as an input and output of the operation. The structure of the rowset is defined by an attribute group of the operator. For the sake of conciseness, it is convenient to refer to field values in the rowset as attribute values of the corresponding attribute in the attribute group. For example, expressing that the attribute AVG_SAL holds average salary values is just a convenient way of stating that a rowset's field that corresponds to the attribute AVG_SAL holds average salary values.

USD_TO_ECU is a downstream operator of AGG1. USD_TO_ECU is a conversion operator because it specifies a formula for converting United States Dollar values in attribute AVG_SAL to European Country Union currency values. The input attribute group for USD_TO_ECU is USD_TO_ECU.InGrp1, which includes one attribute USD_TO_ECU.InGrp1.AVG_SAL. AGG1.OutGrp1.AVG_SAL is mapped as an upstream attribute to USD_TO_ECU.InGrp1.AVG_SAL. The output attribute group, USD_TO_ECU.OutGrp1, has one attribute, USD_TO_ECU.OutGrp1.AVG_SAL_ECU.

AVG_SAL_T is a downstream operator of AGG1 and USD_TO_ECU. AVG_SAL_T is a load operator. A load operator receives an input rowset and modifies a target database based on the input rowset. AVG_SAL_T, in particular, inserts rows from an input rowset into a target database. Similar to source operator EMP, binding metadata may link attributes of the load operator's output attribute group to repository entities in repository metadata 122, thereby binding the dataflow graph DF, the operator AVG_SAL_T, attribute group AVG_SAL_T.InOutGrp1 and its attributes to a target database, the table in the target database, and the table's columns. It should be noted that a load operator may be defined for a dataflow graph without having to bind the load operator.

The input/output attribute group of AVG_SAL_T is AVG_SAL_T.InOutGrp1, which includes attributes AVG_SAL_T.InOutGrp1.AVG_SAL and AVG_SAL_T.InOutGrp1.LOC. USD_TO_ECU.OutGrp1.AVG_SAL_ECU is an upstream attribute mapped to AVG_SAL_T.InOutGrp1.AVG_SAL. AGG1.OutGrp1.LOC is an upstream attribute mapped to AVG_SAL_T.InOutGrp1.LOC.

Dataflow Description

As mentioned before, metadata defining a dataflow may be in the form that conforms to a generic dataflow language. FIGS. 3A and 3B are each a partial view of a dataflow description DFD, which is dataflow metadata that defines dataflow graph DF. Dataflow description DFD contains instructions that conform to a generic dataflow language. A dataflow language defines a syntax for instructions that describe various properties of a dataflow. Some of the syntax is illustrated by dataflow description DF.

As illustrated below, an instruction defines a particular element in a dataflow or particular property of an element in a dataflow. A set of instructions may be referred to herein as a block of instructions ("block"). The instructions in a block define one or more properties of the same element. For example, a block of instructions may define an operator, and the operator's attribute groups, and the attributes of the attribute groups. A block may include other blocks that define a particular element of a dataflow.

Referring to FIGS. 3A and 3B, block 310 defines operator EMP. Line 311 is an instruction that specifies the operator's name (i.e. EMP) and the operator's type. The text 'TYPE TABLE' in line 311 designates the operator's type as a table.

Block 312, which is within block 310, defines attribute group EMP.InOutgrp1. Within block 310 is block 313, which contains instructions that define each of the attributes of EMP.InOutGrp. For example, line 314 defines attribute EMP.InOutgrp.SAL, designating the attribute's data type as NUM (i.e. a number). Other instructions in dataflow description DFD that define attributes are not depicted as designating a data type. Such designations were omitted to reduce clutter and increase clarity of the figures. Data types of an attribute include, but are not limited to, boolean, variable and fixed length strings, integer, floating number, and date.

Block 315 defines operator DEPT and its attribute group DEPT.InOutGrp1 and attributes therein.

Block 320 defines operator FILTER1, and its attribute group FILTER1.InOutGrp1. Line 322 defines the filter condition for the filter operation defined by DEPTID. The filter condition is defined by the expression 'FILTER1.InOutGrp1.DEPTID=100", which is satisfied by input rows that have an attribute value of 100 in DEPTID.

Block 330 defines operator JOIN1, and its attribute groups JOIN1.InGrp1 and JOIN1.InGrp2. Line 332 is an instruction that specifies the join condition for JOIN1, which is defined by the expression "JOIN1.InGrp1.DEPTID=JOIN1.InGrp2.DEPTNO" within line 332.

Block 340 defines aggregate operator AGG1. As mentioned before, an aggregate operator generates an aggregate value for groups of rows in an input rowset. The criteria for grouping the rows is defined by the instruction of line 342, which specifies that input rows are grouped by the values in attribute AGG1.InGrp1.LOC. Line 344 defines the aggregate function and its input, specifying the values to aggregate in the input rows are in attribute InGrp1.SAL.

Block 345 defines operator AVG_SAL_T.

Mappings 360 map the upstream attributes for dataflow graph DF to downstream attributes. For example, line 362 maps EMP.InOutGrp1.ENAME to FILTER1.InOutGrp1.ENAME. By mapping a pair of upstream and downstream attributes, mappings 360 map the attribute groups that contain the attributes. For example, the instructions in line 362, 363, and 364 each map an attribute of EMP.InOutGrp1 to an attribute of FILTER1.InOutGrp1, thereby mapping FILTER1.InOutGrp1 as the downstream attribute group from EMP.InOutGrp1 as the upstream attribute group.

Generating Code

The dataflow description DFD may be implemented in code that conforms to one of a variety of computer languages. The code generating process for generating a code implementation iteratively processes each operator. The operators are processed in a particular order relative to each other. For each operator, a version of the code implementation is generated based on the definition of the operator. The code implementation for a dataflow graph evolves through various versions as each iteration is executed.

Figure 4:
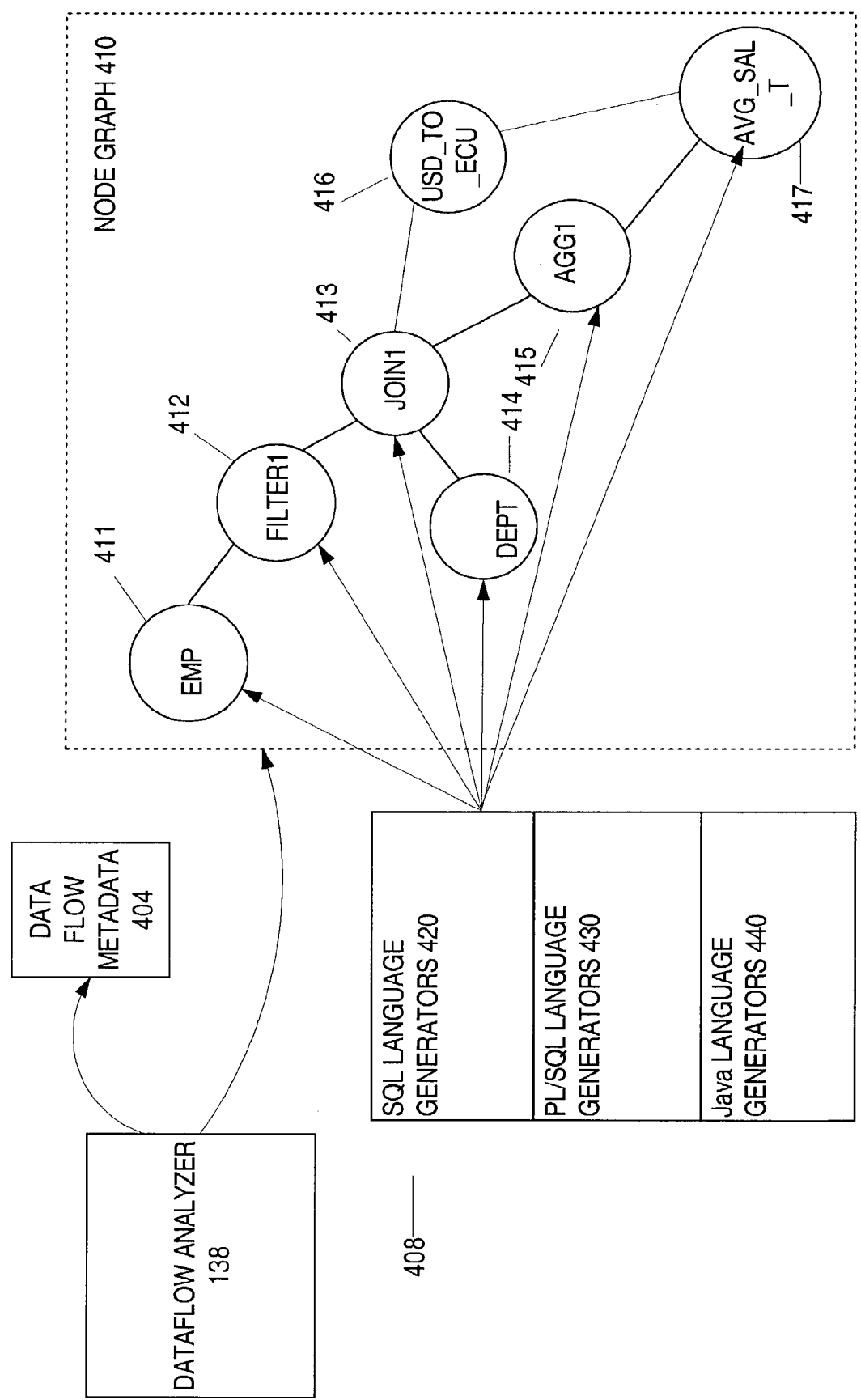
FIG. 4 is a block diagram depicting a system for generating code based on a dataflow description according to an embodiment of the present invention.

FIG. 4 is a diagram depicting an architecture of code generation system 401, a system for generating code implementations according to an embodiment of the present invention. Referring to FIG. 4, it depicts dataflow analyzer 138. As mentioned before, dataflow analyzer 138 is a software component that analyzes a dataflow to generate code implementations. Dataflow analyzer 138 analyzes a dataflow description, such as dataflow description DFD, to determine the order in which to process operators during the code generation process, and to assign implementation language generators to generate code for each operator by using a certain code generation strategy as selected by the user.

An implementation language generator, such as implementation language generators 408, generates a code implementation for a type of operator and particular language referred to as the native language of the implementation language generator. Implementation language generators 408 comprise various sets of implementation language generators, including SQL language generators 420, PL/SQL language generators 430, and Java language generators 440. Each implementation language generator of SQL language generators 420 generates a code implementation in SQL for one or more operator types. For example, SQL language generators 420 include implementation language generators to generate SQL code for the operator types such as join, filter, aggregate, source, and load. PL/SQL language generators 430 include implementation language generators to generate PL/SQL code for one or more operator types. Java language generators 440 include implementation language generators to generate Java code for one or more operator types.

During the code generation process, the implementation language generator executed for each operator generates a generation context, which is a data representation of a version of a code implementation. To generate a generation context code for an operator, the implementation language generator evaluates both the generation context generated for one or more upstream operators generated in a previous iteration, and the definition of the operator in the dataflow metadata. The implementation language generator does not examine another operator (i.e. the definition of another operator) in the dataflow. In this way, the implementation language generator assigned to an operator generates an implementation code version in a way that is independent of the definition and existence of any other operator in the dataflow, thus allowing an arbitrary data flow graph to be generated, with no limitation on the number and type of operators and on how these operators are interconnected.

The implementation language generator assigned to the operators of a dataflow description may not generate code in the same computer language. Different languages define different syntaxes and semantics. Generation contexts used to represent a code implementation in one language may have different formats, structures, or semantics than one in another language. To enable implementation language generators for different languages to be used for the same dataflow graph, the code generation process converts a generation context generated by an implementation language generator in one language into a language needed by another implementation language generator.

Generating Node Subgraph

To determine an order in which to process each operator during the code generation process, dataflow analyzer 138 generates a node graph, such as node graph 410. As shall be explained in greater detail, the node graph defines a "topological order" between the operators in a dataflow graph. A linear order for processing operators during code generation is determined based on the topological order.

Referring to FIG. 4, it shows node graph 410, which contains nodes representing an operator in dataflow graph DF. Nodes 411, 412, 413, 414, 415, 416, and 417 represent operators EMP, FILTER1, JOIN1, DEPT, AGG1, USD_TO_ECU, AVG_SAL_T, respectively. An edge connects an "upstream node" representing an upstream operator to a "downstream node" representing a downstream operator. The edges to generate between nodes in a node graph is determined by examining the mappings between attributes in dataflow description DFD (e.g. the mappings in block 360).

The topological order of a node is based on its position within the node graph. In topological order, the order of an upstream operator is before that of the downstream node. Based on the node graph 413, the order of node 413 is after node 411, 412, and 414 but before nodes 415, 416, and 417.

Dataflow analyzer 138 generates a linear order for operators in dataflow DF that is consistent with the topological order of their nodes in node graph 410. Thus, the following linear orders are consistent with the topological order.

1. EMP, FILTER1, DEPT, JOIN1, AGG1, USD_TO_ECU, AVG_SAL_T
2. EMP, DEPT, FILTER1, JOIN1, AGG1, USD_TO_ECU, AVF_SAL_T.

To generate a code implementation, the implementation language generators assigned to an operator are invoked sequentially according to the linear order.

Code Generation Strategy

A code generation strategy is used by the code generator to assign an implementation language generator for each operator during code generation. A set of code generation strategies are available for each deployment language. If a dataflow can be implemented into multiple deployment languages, the user will be allowed to select one deployment language. Given a deployment language, a set of code generation strategies may be selected by a user to determine how to generate a dataflow in that deployment language. The set of supported code generation strategies represent the "knowledge" about what kind of data flow graph is supported by the code generation system 401. In other words, dataflow analyzer 138 uses the code generation strategies that are implemented to determine how to implement a particular operator or combination of operators. Different code generation strategies have different performance characteristics, and represent how efficient the resultant code is. For example, given PL/SQL as the deployment language, the user can select "set-based", "row-based" and "row-based-target" code generation strategies. Each of these have different runtime behaviors: "set-based" for best performance with no information about row errors (thus uses a SQL statement), "row-based" for reasonable performance with detailed information about row errors (thus uses a cursor loop and performs most transformation processing and loading in the loop), while "row-based-target" for better performance compared with "row-based" (thus uses a cursor loop to mainly perform loading in the loop).

Note that both a SQL and PL/SQL implementation language generator can be used to generate code with PL/SQL as the deployment language, based on the fact that SQL can be "embedded" within PL/SQL as the definition of the cursor. Also, once an operator has been assigned PL/SQL (i.e. has been assigned an implementation language operator for PL/SQL), subsequent operators in the linear order for a dataflow must be assigned a PL/SQL implementation language generator. This restriction is referred to herein as the downstream PL/SQL restriction.

Finally, dataflow analyzer 138 may use other code generation strategies based on various rules and criteria for determining how to implement a particular operator or combination of operators for a dataflow in a more efficient manner.

Process for Generating Code

Figure 5A:
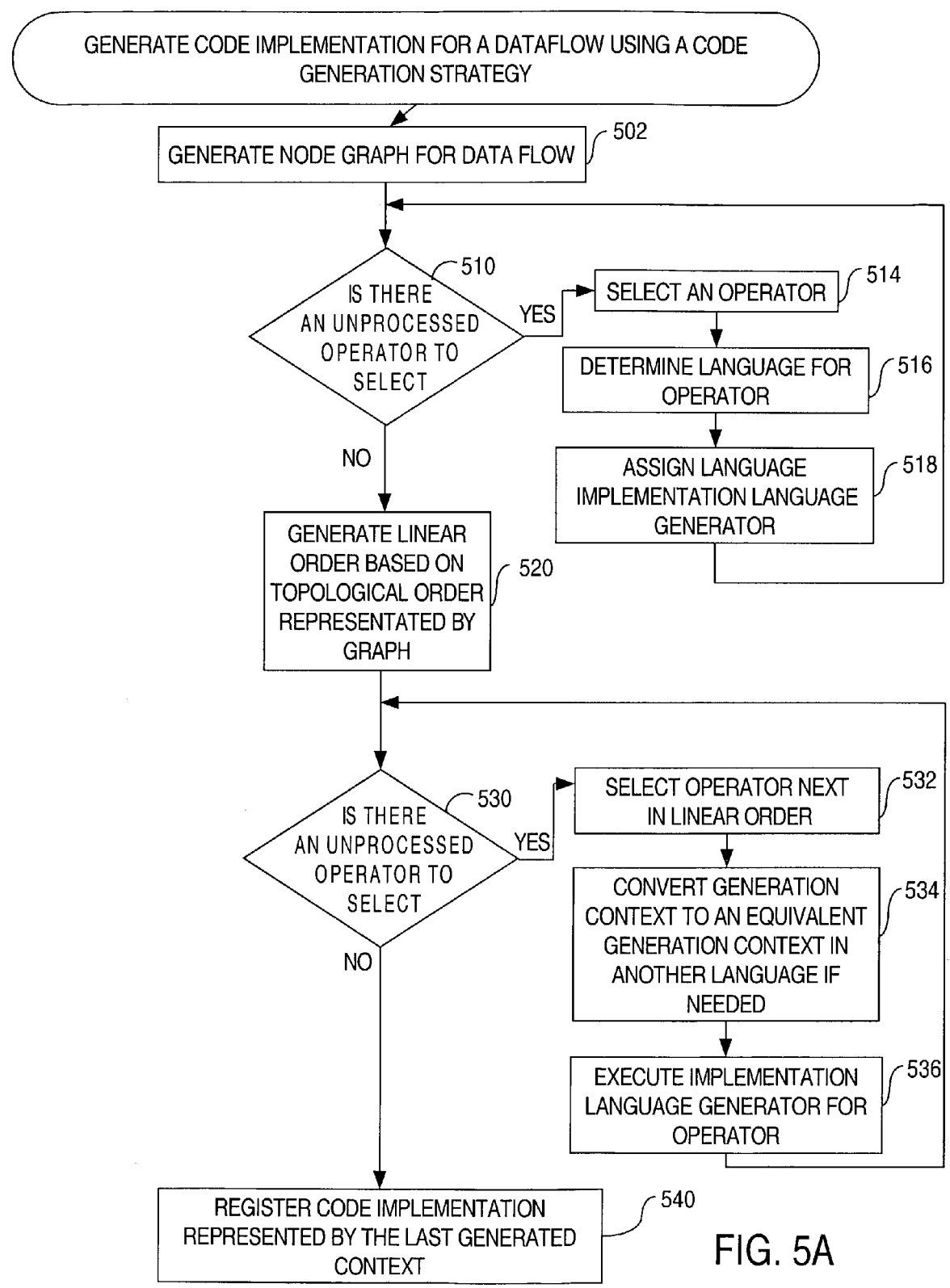
FIG. 5A is a flowchart depicting a process for generating a code implementation of a dataflow according to an embodiment of the present invention.

FIG. 5A is a flowchart depicting a code generation process for generating a code implementation for dataflow description DFD. The process is invoked for each code generation strategy for which code is generated. At step 502, the dataflow analyzer 138 generates node graph 410.

Steps 510, 514, and 516 represent a loop of execution that processes each operator represented by node graph 410 to select an implementation language generator for the operator. At step 510, dataflow analyzer 138 determines whether there is an operator that has not been processed by the loop of execution. If not, then at step 514, the dataflow analyzer 138 selects an unprocessed operator as the "current operator".

At step 516, dataflow analyzer 138 determines the implementation language generator to use to generate the generation context for the operator. This determination is based on the code generation strategy that is used. It is possible that the operator cannot be implemented according to the code generation strategy or downstream PL/SQL restriction. In this case, the code generation process may be aborted.

For example, the downstream PL/SQL restriction is incorporated in the "row-based" and "row-based-target" code generation strategies. When using these code generation strategies to assign implementation language generators to operators in the data flow graph, the downstream PL/SQL restriction is taken into account. If the downstream PL/SQL restriction cannot be satisfied, the code generation strategy will return an error to the dataflow analyzer 138, which in turn will abort the generation process.

In the current illustration, the selected code strategy is set-based. Hence, at step 516, an SQL implementation language generator is selected.

At step 518, dataflow analyzer 138 assigns a language implementation generator for the selected language and the operator's type. After execution of the loop, each of the operators defined by dataflow description DFD is assigned an implementation language generator from SQL language generators 420.

At step 520, the dataflow generator determines a linear order based on the topological order represented by the node graph 410.

Steps 530, 532, 534, and 536 comprise a loop of execution that processes each operator represented by node graph 410 to invoke the implementation language generator assigned to the operator. The operators are processed sequentially according to the linear order determined at step 520. At step 530, dataflow analyzer 138 determines whether there is an operator that has not been processed by the loop of execution. If not, then at step 532, dataflow analyzer 138 selects an unprocessed operator ("current operator").

At step 534, the generation context generated in the previous iteration of the loop, if any, is converted to the language of the implementation language generator of the current operator, if the language is different than that of generation context generated in the previous iteration of the loop. The conversion is performed by invoking a conversion routine rather than relying on a method of an implementation language generator. The conversion routine can convert one generation context in one implementation language to an equivalent generation context in another implementation language, independently of any particular instance of an implementation language generator. The conversion routine needs to be implemented in only one routine, freeing the implementer of an implementation language generator from the task of configuring an implementation language generator to convert generation contexts. Execution of the loop thus constructs the generation context for a downstream attribute group from the upstream attribute group(s), to make any appropriate and necessary generation context conversion before passing the converted context to the implementation language generator of the current operator.

At step 536, dataflow analyzer 138 invokes the language implementation generator assigned to the operator, thereby generating a generation context for the operator. The generation contexts generated in the loop are described in greater detail below.

At step 540, the code implementation that is represented by the last generated generation context is registered, that is, stored as a complete module.

In the case of dataflow graph 201, the code implementation registered is also established as the complete code implementation for dataflow graph 201. However, the generation context registered at this step may not be established in this way for all types of dataflow graphs, particularly for dataflow graphs with two or more target tables as illustrated in FIG. 5B by the dataflow graphs shown therein.

Referring to FIG. 5B, it shows dataflow graph 580 and 590. Dataflow graph 580 has two "end-points", represented by load operators TARGET_TABLE_1 and TARGET_TABLE_2. The generation context generated for some types of operator, such as load operators, is "complete", that is, it represents a complete routine that can be executed to perform the data flow described, such as a full SQL statement with INSERT INTO <target_table>SELECT ... FROM .... The implementation language generator for these types of operators register the completed generation contexts to the dataflow analyzer. After the whole code generation process is completed, all the registered generation contexts will be assembled together to produce the final generated code. The generation contexts generated from implementation language generators of TARGET_TABLE_1 and TARGET_TABLE_2 are registered and then assembled to form a single generated script that represents this data flow.

Dataflow graph 590, unlike dataflow glow graph 580, has only one end-point in the graph. Nevertheless, in the case of dataflow graph 590, a separate generation context is generated and registered for both TARGET_TABLE_3 and TARGET_TABLE_4, as follows.

For TARGET_TABLE_3, the generation context is: INSERT INTO TARGET_TABLE_3 SELECT ... FROM SOURCE_TABLE.

For TARGET_TABLE_4, the generation context is: INSERT INTO TARGET_TABLE_4 SELECT ... FROM TARGET_TABLE_3

Although there is only one end-point in the graph, it is necessary to assemble two separate generation contexts to form a single generated script containing two statements to represent the data flow because a single statement in SQL can only specify an insertion operation for one table.

It is useful to the developer to see how code generated by a code generation process evolves. In an embodiment, the generation context for each of the operators in a dataflow graph may be viewed by the user. Through GUI 136, a user may select a graphical component corresponding to an attribute group of an operator to view the generation context created for the attribute group of that operator. In this way, the developer may view intermediate results of the code generation process. This feature is particular useful to debugging.

ILLUSTRATIVE GENERATION CONTEXT

Figure 6A:
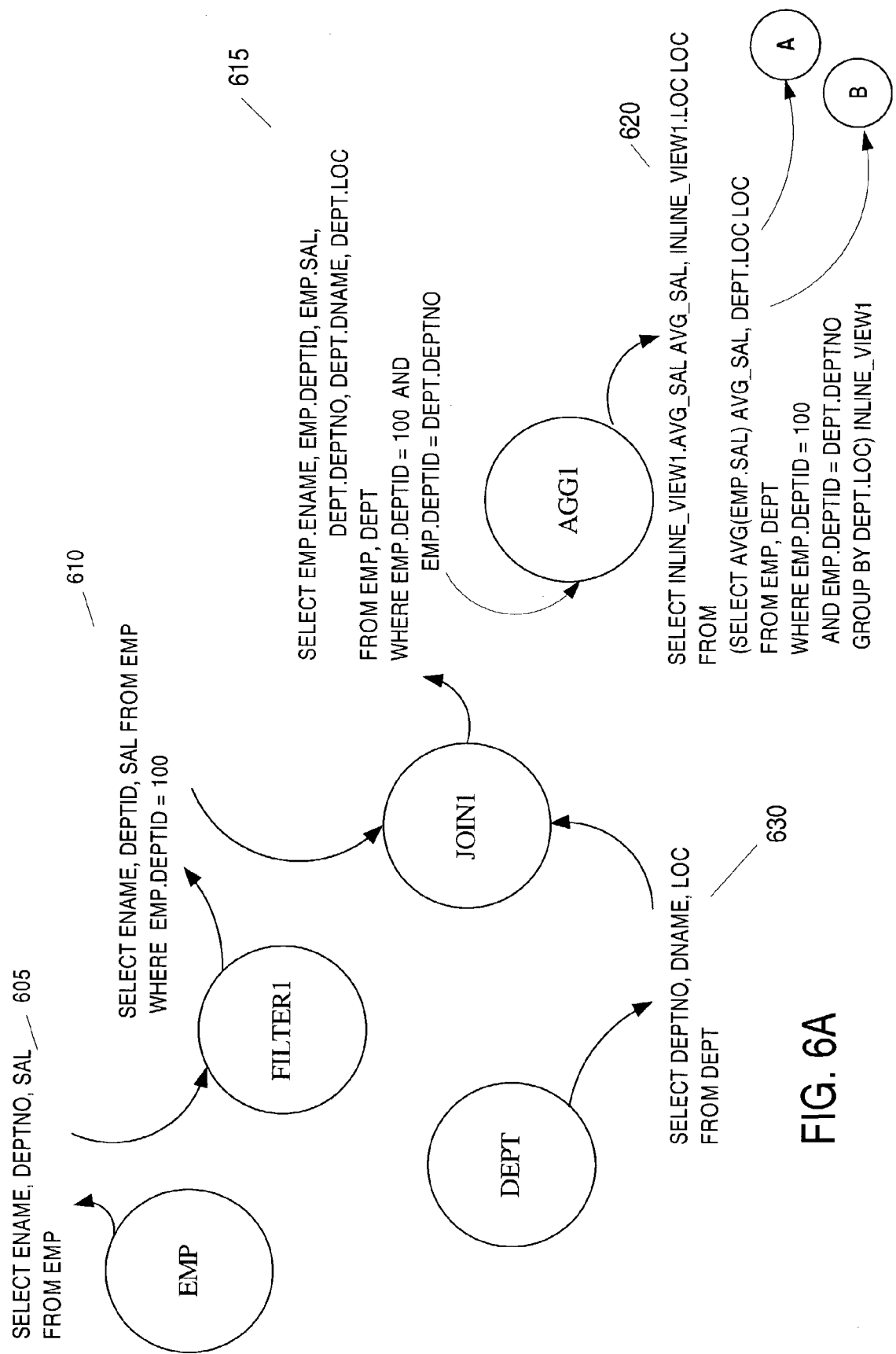
Figure 6B:
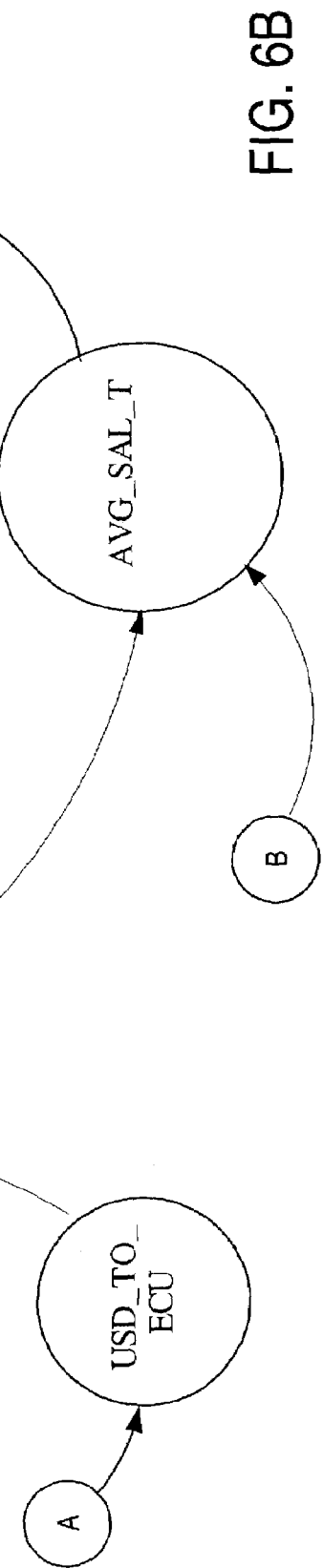

FIG. 6 depicts generation contexts generated by the code generation process depicted in FIG. 5A. Referring to FIG. 6, context 605 is the generation context generated by the implementation language generator assigned to operator EMP. As mentioned before, EMP is a source operator defining an operation that retrieves rows and columns from a table in a source database system. Context 605 represents the SQL select statement that implements that operation in SQL.

Context 630 is the generation context generated by the implementation language generator assigned to operator DEPT. DEPT is a source operator defining an operation that retrieves rows and columns corresponding to attributes in DEPT.InOutGrp1 from a table in the source database system. Context 630 represents the SQL select statement that implements the operation in SQL.

Context 610 is the generation context generated by the implementation language generator for FILTER1. In SQL, filter operations are defined by WHERE clauses. The implementation language generator determines the syntax of the SQL statement needed to not only implement the filter operation, but to implement those currently specified in context 605, by evaluating context 605 and the portion of dataflow description DFD defining FILTER1. The generation context generated for an adjacent downstream operator is referred to herein as a previous context.

Context 615 is the generation context generated by the implementation language generator for JOIN1. In SQL, joins are implemented by referring to the tables to join in the FROM clause and specifying in the WHERE clause a join condition based on a column from each of the tables. The implementation language generator determines the syntax of the SQL statement needed to not only implement the join but to implement those currently specified in previous generation contexts 610 and 630, by examining them and the dataflow metadata defining the operator.

Context 620 is the generation context generated by the implementation language generator for AGG1. In SQL, aggregation operations are implemented by referencing an aggregation function and one or more columns containing values by which to group the aggregation results. The implementation language generator determines the syntax of the SQL statement needed to implement the aggregation operation and those currently specified in any previous generation context, by examining previous context 615 and the dataflow metadata defining the operator.

Context 625 is the generation context generated by the implementation language generator of USD_TO_ECU. The SQL statement specifies an expression to convert United States Dollar values generated for the aggregate function AVG(EMP.InOutGrp1.SAL) into European Country Union currency values. The implementation language generator for USD_TO_ECU determines the syntax of the SQL statement needed to implement the conversion operation and those currently specified in the previous generation context 620, by examining previous context 620 and the dataflow metadata defining the operator.

Context 627 is the generation context generated by the implementation language generator for AVG_SAL_T. Here the load operation implemented is the insertion of rows. In SQL, row insertion is implemented using an INSERT clause. The implementation language generator determines the syntax of the SQL statement needed to implement the insertion operation and those currently specified in the previous generation context 620 and 625, by examining them and the dataflow metadata defining the operator.

IMPLEMENTATION DATAFLOWS IN MULTIPLE LANGUAGES

For the operators of a given dataflow, dataflow analyzer 138 may assign implementation language generators for different languages, and generate a code implementation containing code in the different languages. For example, because the user has selected the row-based strategy, dataflow analyzer 138 assigns SQL implementation language generator to operators EMP, FILTER1, DEPT, JOIN1, AGG1, and PL/SQL implementation language generator to operators USD_TO_ECU and AVG_SAL_T.

FIG. 6C shows the generation contexts generated for USD_TO_ECU and AVG_SAL_T in PL/SQL. The generation contexts generated for operator JOIN1 and the operators before JOIN1 are shown in FIG. 6A. Context 635 is the generation context generated for USD_TO_ECU. Context 640 is the generation context generated for AVG_SAL_T. In generating context 635, context 620 was converted into a form understandable by a PL/SQL implementation language generator.

RECONCILIATION

As alluded to earlier, a repository entity to which a dataflow is bound may change, requiring changes to the dataflow that reflect changes to the repository entity. Likewise, changes to a dataflow may require changes to repository entities. The entities that have changed are referred to as source objects, while the entities that may need to be changed in order to make them compatible with the source objects are referred to as target objects. Thus, if the source objects are changed repository entities, then the target objects are elements of a dataflow. On the other hand, if the source objects are changed elements of a dataflow, the target objects are repository entities that may need to be changed in order to make them compatible with the changed dataflow elements.

Generally, the changes fall into one of two categories, correlation changes and property changes. A correlation change is one that involves binding or unbinding entities. For example, a table column to which an attribute of an operator is bound is replaced by a new column. The change requires that the attribute be bounded to the new column.

A property change is a change to the property of an entity, where the change requires a change to a corresponding property in another entity that is bounded to the changed entity. For example, a column typed as an integer may be bound to an attribute typed as an integer. The column type is modified to string, requiring changing the type of the attribute to string, but not requiring a change to the correlation between the attribute and the column. To make the data type of the bounded attribute compatible with that of the changed column, the attribute's type is changed to string. The process of changing an entity so that it is compatible with changes made to the other entity is referred to herein as reconciliation.

The reconciliation process described herein is commenced by establishing, at least tentatively, a correlation for binding repository entities and dataflow elements. This correlation is established using a variety of matching strategies for matching repository entities to dataflow elements. Matching strategies used to establish a correlation may be selected by the user through the GUI of binding utilities 134. Once the correlation between the repository entities and dataflow elements is established, the correlation changes and property changes are identified, and a reconciliation plan is generated. A reconciliation plan specifies action items for changing the dataflow element. The reconciliation plan is presented in a GUI interface to a user, who may modify the plan.

DATA STRUCTURES AND OBJECTS USED FOR RECONCILIATION

Figure 7:
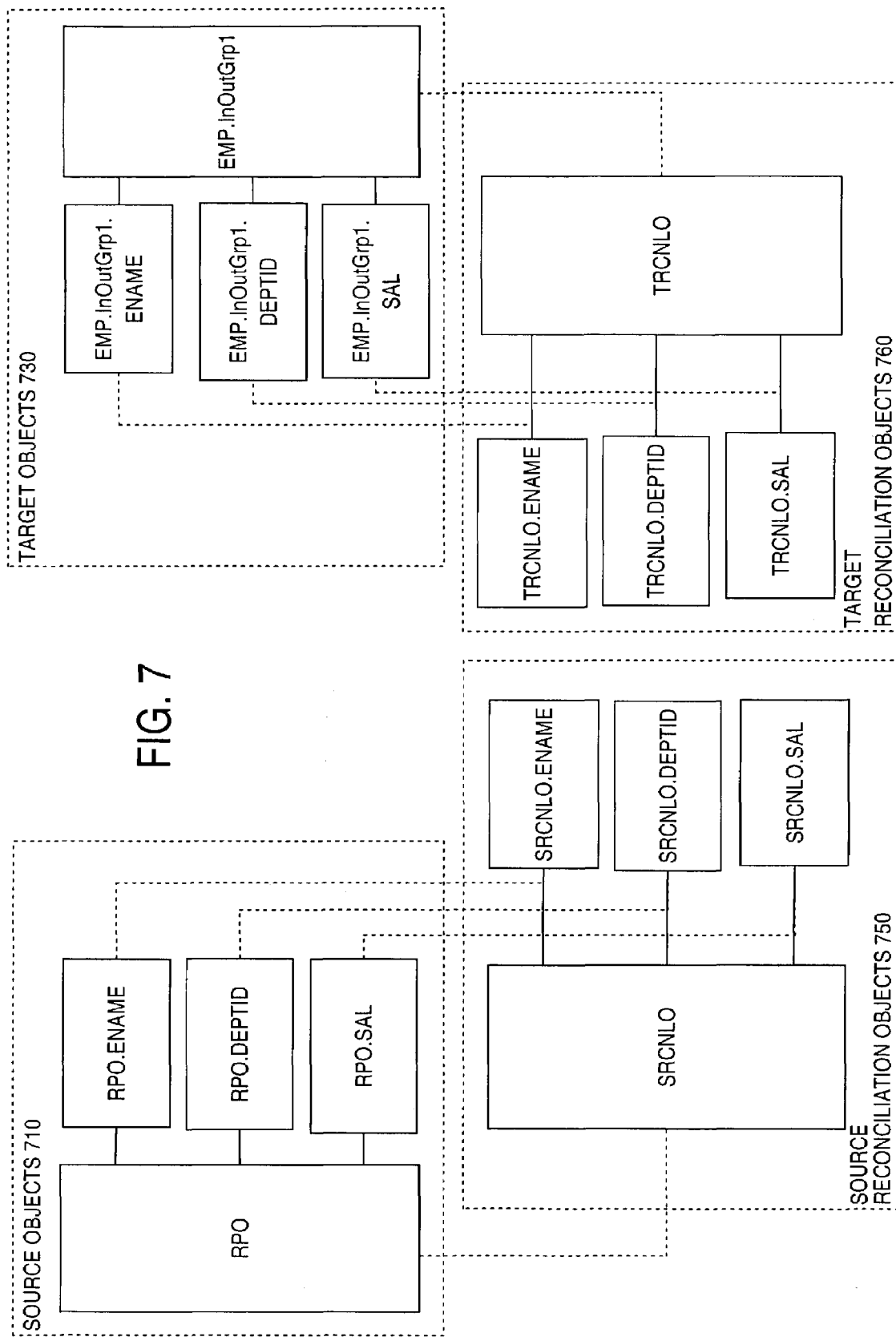
FIG. 7 is a block diagram depicting components used by a reconciliation process to reconcile a dataflow with repository entities according to an embodiment of the present invention.

FIG. 7 shows data structures generated by reconciliation tool 133 to match and compare a repository entity and dataflow element to determine the differences between them. As shall be described in greater detail, the techniques described in here for reconciliation are not limited to reconciling database and dataflow entities and elements.

Referring to FIG. 7, it shows source objects 710 and target objects 730. Source objects 710 are comprised of repository objects RPO, which represents a table in a described database, and the child objects of RPO, RPO.ENAME, RPO.DEPTID, and RPO.SAL, which represent columns of the table. Child objects represent elements of the entity represented by the parent object.

Target objects 730 are Emp.InOutGrp1, EMP.InOutGrp1.ENAME, EMP.InOutGrp1.DEPTID, and EMP.InOutGrp1.SAL. Binding metadata 124 binds repository entities by RPO, RPO.ENAME, RPO.DEPTID, RPO.SAL to EMP, EMP.InOutGrp1.ENAME, EMP.InOutGrp1.DEPTID, and EMP.InOutGrp1.SAL, respectively.

Reconciliation objects, such as reconciliation objects 750 and 760, contain reconciliation information that is used for reconciliation and that is formatted in a common format. Reconciliation information in the reconciliation objects is used to match source objects with target objects, and to determine differences between entities represented by the source and target objects.

Some source objects may match a target object, some may not. A matched source object may be, for example, a repository entity bounded to an attribute of an attribute group. The repository entity may have changed, requiring a change to an attribute. An unmatched source object may be, for example, a new column not yet bounded to an attribute. An unmatched target object may be, for example, an attribute that is bound to a column which has been deleted. Source reconciliation objects 750 contain reconciliation information for source objects 710; target reconciliation objects 760 contain reconciliation information for target objects 730.

Reconciliation information about the source or target represented by a reconciliation object can include the name of the entity (e.g. field, table, column, attribute, or attribute group name), its data type, data type properties (e.g. length of string), or the ordinal position of the entity (e.g. ordinal position of an attribute within an attribute group or a column within a table). Reconciliation information also includes binding data. Binding data binding an attribute of an operator to a repository object may be in the form of a mapping that maps the attribute to a unique object id of the repository object. For example, EMP.InOutGrp1.ENAME is bound to RPO.ENAME. RPO.ENAME has an object id. To represent the binding between them, binding metadata 124 may include a mapping that maps EMP.InOutGrp1.ENAME to the object id of RPO.ENAME. The reconciliation objects corresponding to EMP.InOutGrp1.ENAME and RPO.ENAME both contain the object identifier as binding data.

The purpose of using a common format is to provide a common abstraction through which to use and access the reconciliation information. At least a portion of the information in the reconciliation objects is derived from the source and target objects themselves. To perform reconciliation, it is possible to access reconciliation information in the source and target objects rather than creating and using separate reconciliation objects. However, different types of source objects have a format and structure that is different from other types of source objects. For example, repository objects used to represent data stored in a table may have a different structure than ones used to store data in a flat file. Developing software to access information through one common abstraction is far easier and less expensive than developing software that accesses the information through many abstractions.

In an embodiment of the present invention, the structure of the target object is used as the common format. Thus, generation of target reconciliation object 750 entails converting the source objects 710 into reconciliation objects having the structure of target objects 730.

Source reconciliation objects 750 and target reconciliation objects 760 represent source objects 710 and target objects 730 in the common format. Source reconciliation objects SRCNLO, SRCNLO.ENAME, SRCNLO.DEPTID, and SRCNLO.SAL correspond to RPO, RPO.ENAME, RPO.DEPTID, and RPO.SAL respectively, and have a parent-child relationship that reflects that of source objects 710. Target reconciliation objects TRCNLO, TRCNLO.ENAME, TRCNLO.DEPTID, and TRCNLO.SAL correspond to Emp.InOutGrp1, Emp.InOutGrp1.ENAME, Emp.InOutGrp1.DEPTID, and Emp.InOutGrp1.SAL respectively, and have a parent-child relationship that reflects that of target objects 730.

MATCHING STRATEGIES

Various matching strategies may be used to match a source object with a target object. These matching strategies, include, but are not limited, to the following.

1. Binding data strategy—Under the binding data strategy, source objects are matched to target objects according to pre-existing binding data that binds them. For example, as mentioned before, binding metadata 124 represents that an attribute of an operator is bound to a repository object by including a mapping that maps the attribute to the object id of the repository object. The reconciliation objects of both the source and target objects store these object identifiers. Source reconciliation objects 750 contain object ids identifying their respective source object 710. Target reconciliation objects 760 store object ids of the repository object to which the respective target objects are bound. A source object matches a target object if their respective reconciliation objects store the same object id. Thus, if the stored object id in SRCNLO matches the stored object id in TRCNLO, RPO is considered matched to Emp.InOutGrp1.

An advantage of the binding data approach is that it leverages pre-existing binding data to establish a tentative correlation that very likely reflects the final binding that should exist after reconciliation. In general, the reconciliation process is more useful when it more accurately ascertains the differences between source objects and target objects and the final binding between them, leaving less for the user to do when reviewing and/or modify a reconciliation plan. Often, reconciliation changes involve mostly property changes and little if any correlation changes. Thus, the pre-existing binding data is often a very accurate indication of the correlation that should exist between source objects and target objects after changing the repository objects.

2. Shared Parent Same Position—Under the shared parent strategy, a source object matches a target object if their parents match and they occupy the same ordinal position under the parent. This strategy may be used when, for example, there is no match for a source object under the binding data strategy. For purposes of illustration, Emp.InOutGrp1.SAL is not bounded to a repository object, thus RPO.SAL does not match a target object under the binding data strategy. Hence, RPO.SAL and Emp.InOutGrp1.SAL have the same ordinal position under their respective matched parents and are therefore matched to each other under this strategy.

3. Same Name Strategy.—Under the same name strategy, a source object matches a target object if their parents match and they have the same name or label. This strategy may be used when, for example, there is no match for a source object under the binding data strategy. For example, RPO.ENAME and Emp.InOutGrp1.ENAME could be matched because they are both labeled "ENAME", and their parents RPO and Emp.InOutGrp1 have been matched.

RECONCILIATION PROCESS

Figure 8:
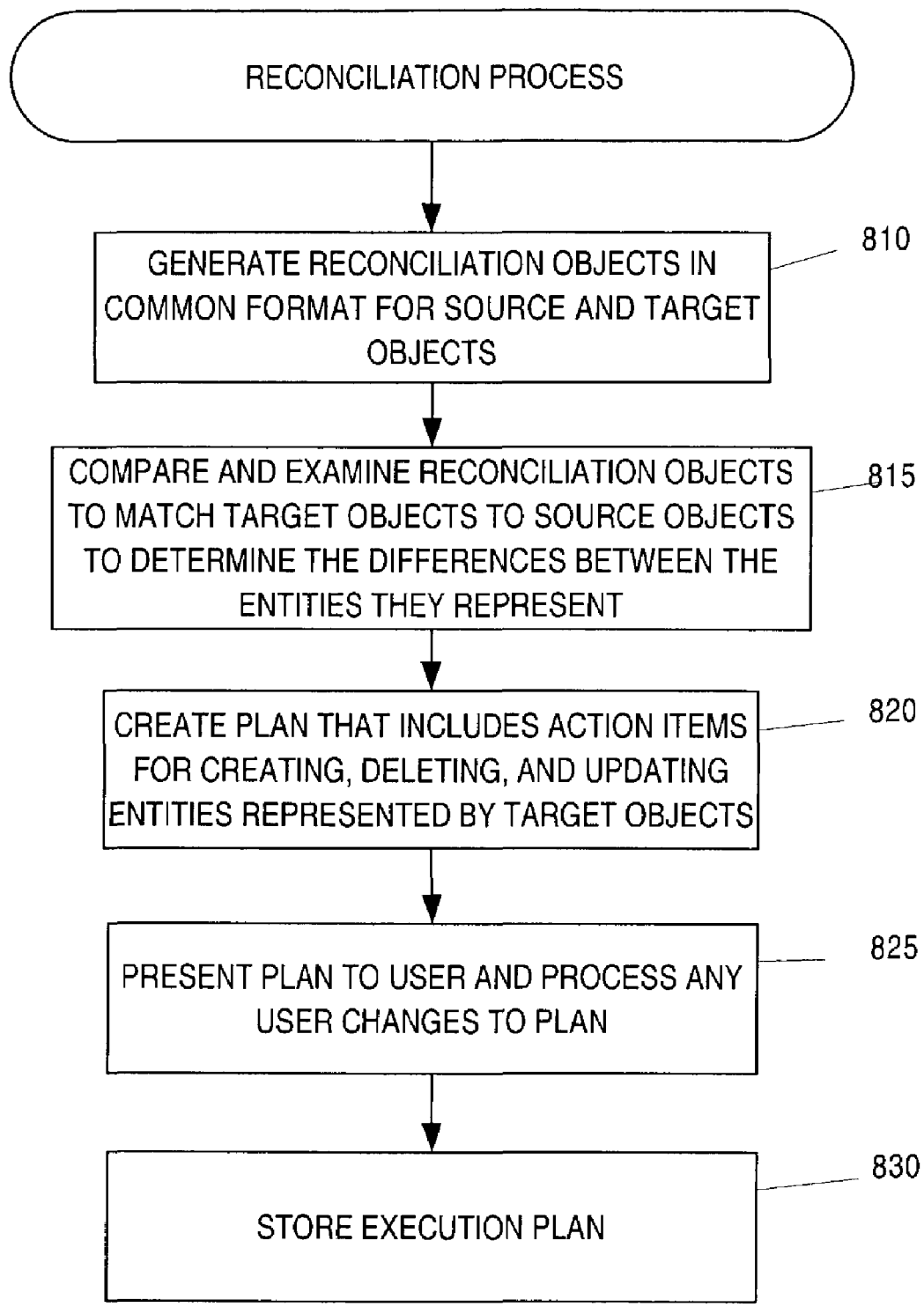
FIG. 8 is a flowchart depicting a process that may be used to reconcile a dataflow with repository entities according to an embodiment of the present invention.

FIG. 8 shows a reconciliation process according to an embodiment of the present invention. The steps are illustrated using the objects depicted by FIG. 7. Referring to FIG. 8, at step 810, the reconciliation tool 133 generates reconciliation objects in the common format for the source objects 710 and target objects 730.

At step 815, reconciliation tool 133 compares and examines reconciliation objects to match target objects to source objects to determine the differences between the entities they represent. To match the source objects, matching strategies, such as those already discussed, are used. When a target object and source object have been matched, the differences between them is determined. Such differences include their respective names, data types, or a property related to a data type. For example, both RPO.ENAME and Emp.InOutGrp1.ENAME have been matched. Both of them have the same data type, i.e. string, but the maximum string length of RPO.ENAME is 25 and the maximum string length of Emp.InOutGrp1.ENAME is 30. Thus, the difference between them is the maximum string length.

At step 820, a reconciliation plan is generated for updating the target objects. The plan specifies three types of action items: update target object, create target object, and delete target object. Update target object specifies to change a target object so that, for example, the target object is compatible with a change to the matched source object, e.g. to change the maximum string length of Emp.InOutGrp1.ENAME to 25 so that the maximum string length matches that of RPO.ENAME.

Create target object is an action item generated for unmatched source objects. For example, if RPO.SAL was not matched, then a create action item could be to create an attribute in Emp.InOutGrp1 with the same name and data type as RPO.SAL.

Delete target object is an action item generated for unmatched target objects.

At step 825, reconciliation tool 133 presents the reconciliation plan to the user in a GUI interface. The GUI interface contains mechanisms for modifying the reconciliation plan, including modifying action items, deleting action items, and adding action items.

At step 830, the reconciliation plan is stored. The reconciliation plan may be later executed to effect the changes to a dataflow description. When executed, the action items are executed in the following order: delete target object, update target object, and create target object.

ALTERNATE EMBODIMENTS

The techniques used for reconciliation described in the present application may not only be used to reconcile two entities but to merge them. In particular, after a reconciliation plan is generated with delete actions, the user or "execution engine" can decide not to execute those delete actions, resulting in a "merge" of metadata between the first entity and the second entity. A "merge" has its own use for metadata management—an analogy would be in a development environment where the functional description of software is given as text files (called source files). A merge of the different versions of a source file written by different software developers would result in software with combined functionalities. Likewise, a merge of different versions of a dataflow plan would result in a data flow with combined functionalities. The user may indicate to whether or not to merge by selecting a "merge execution option" through the GUI provided in binding utilities 134.

The reconciliation process described herein has been illustrated using source objects that are repository objects and target objects that are dataflow objects. However, the reconciliation process is not so limited. For example, source objects may be dataflow objects and target objects may be repository objects. The action items generated in this case update, create, or delete repository objects.

Furthermore, the reconciliation process is not limited to reconciling dataflow objects and repository objects. The reconciliation process may be used to reconcile any set of entities that are bounded, where one set of entities after being changed need to be reconciled to another set of entities. The entities bounded may be data structures, objects developed according to an object oriented methodology, or even a function signature and its parameters.

An example of another scenario in which the reconciliation process may be applied is a process flow. A process flow, as the term is used herein, defines an execution dependency between a set of activities and the inputs to those activities. Activities are tasks, jobs, or processes, such as a transmission of an electronic mail message or a data flow. A process flow contains a set of activity objects, with transition objects between activity objects that describes the execution dependency between them. An activity object contains, among other information, a set of parameter objects that defines what types of parameters should be passed in to execute the activity. When a data flow is manifested as an activity object in a process flow, the parameters of the data flow object are bound to the parameters of the activity object. The data flow may change, necessitating changes to the activity object, which may be accomplished using the reconciliation process described herein. In applying the reconciliation process under this scenario, the source objects would correspond to the data flow object and its parameters and the target object would correspond to the set of parameter objects in the activity object.

Finally, the reconciliation process is not limited to reconciling sets of objects for which some binding data already exists, but may be used to establish a binding between sets of bindable objects that are not yet binded. Bindable objects are objects for which there exists some knowledge and/or information that correlates one set of objects with another set of objects, and for which there is some basis to apply a strategy to reconcile and/or correlate (e.g. matching strategy) the sets of objects, thereby establishing a binding between the sets. According to an embodiment, the knowledge may be represented by software code that has been configured to convert source objects and target objects to a common format so that they can be matched according to one or more matching strategies.

HARDWARE OVERVIEW

Figure 9:
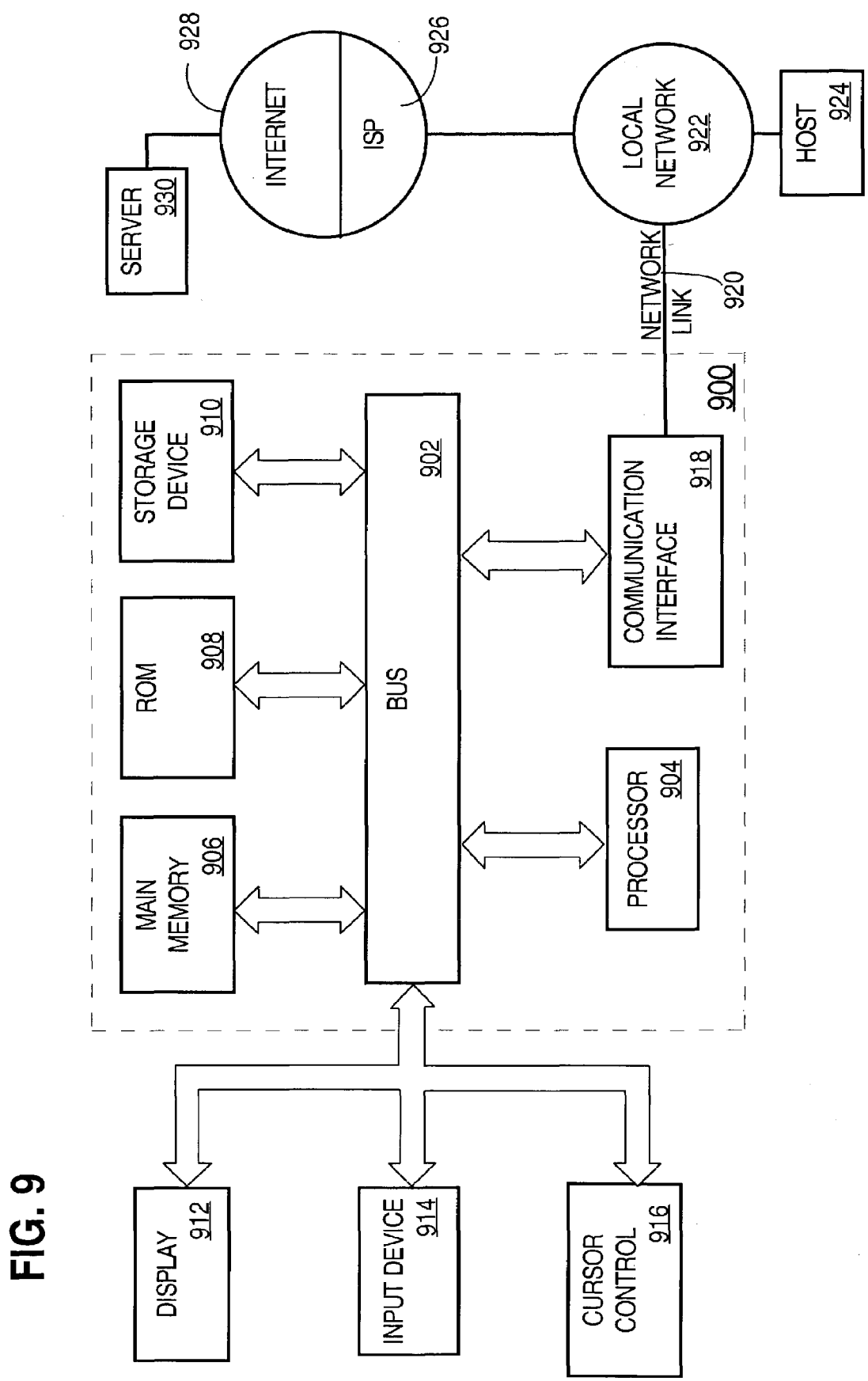
FIG. 9 is a block diagram of computer system that may be used to implement an embodiment of the present invention.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for implementing the techniques described herein. According to one embodiment of the invention, those techniques are performed by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

What is claimed is:

1. A method used for reconciling a definition of a first set of entities to a definition of a second set of entities, comprising the steps:

generating a first set of objects that:
  contains information derived from first metadata that defines said first set of entities, and
  conforms to a common format;
generating a second set of objects that:
  contains information derived from second metadata that defines said second set of entities, and
  conforms to said common format;
determining differences between how first metadata defines said first set of entities and how second metadata defines said second set of entities;
wherein the step of determining differences is based on examining said first set of objects and said second set of objects;
generating a plan that specifies one or more actions for modifying said second metadata to reconcile the definition of said second set of entities with the definition of said first set of entities; and
executing the plan, wherein execution of the plan causes modification of said second metadata.

2. The method of claim 1, wherein:
the second metadata includes one or more objects that conform to a particular format; and
the step of generating a first set of objects includes generating a set of objects that conform to said particular format.

3. The method of claim 1, wherein said first set of entities include database entities.

4. The method of claim 1, wherein said second set of entities includes database entities.

5. The method of claim 1, wherein said first set of entities includes entities defined by a dataflow description.

6. The method of claim 1, wherein said second set of entities includes entities defined by a dataflow description.

7. The method of claim 1, the steps further including determining a second subset of said second set of entities that match a first subset of said first set of entities based on one or more matching criteria.

8. The method of claim 7, wherein:
for a first entity in said first subset matched to a second entity in said second subset, determining one or more differences between the definition of the first entity and the definition of the second entity; and
the step of generating an execution plan includes generating an action for modifying the definition of said second entity.

9. The method of claim 7, wherein the step of generating an execution plan includes generating, for a first entity in said first set of entities that is not matched to a second entity in said second subset, an action for modifying said second metadata to define a new entity reflecting the definition of said first entity.

10. The method of claim 9, wherein the step of generating an execution plan includes generating, for a second entity in said second set of entities not matched to a first entity in said first subset, no action item for modifying said second metadata to delete said second entity from said second set of entities, thereby merging the first set of entities and the second set of entities.

11. The method of claim 7, wherein the step of generating an execution plan includes generating, for a second entity in said second set of entities not matched to a first entity in said first subset, an action item for modifying said second metadata to delete said second entity from said second set of entities.

12. The method of claim 1, wherein:
the steps further include:
- presenting the plan in a user interface to a user;
- receiving user input from the user specifying changes to the plan; and the step of generating the execution plan includes generating an execution plan that reflects said changes to the plan.

13. The method of claim 1, further including the step of:
determining a correlation between first members of said first set and second members of said second set; and
wherein the step of determining differences is based on said correlation.

14. The method of claim 13, wherein:
before executing the step of determining differences, binding data correlates at least some of said first members to said second members; and
the step of determining a correlation is based on said binding data.

15. The method of claim 13, further including:
for each first member of said first set that correlates to a second member of said second set, determining property differences between said first member and said second member.

16. The method of claim 13, wherein:
said correlation does not correlate a first member of said first set to a second member of said second set;
the step of determining differences includes determining that said second set does not include a member that correlates to said first member; and
the step of generating a plan includes generating a plan that specifies an action for adding a new member to said second set of entities that correlates to said first member.

17. A computer-readable storage medium carrying one or more sequences of instructions which, when executed by one or more processors, causes the one or more processors to perform the method recited in claim 1.

18. A computer-readable storage medium carrying one or more sequences of instructions which, when executed by one or more processors, causes the one or more processors to perform the method recited in claim 2.

19. A computer-readable storage medium carrying one or more sequences of instructions which, when executed by one or more processors, causes the one or more processors to perform the method recited in claim 3.

20. A computer-readable storage medium carrying one or more sequences of instructions which, when executed by one or more processors, causes the one or more processors to perform the method recited in claim 4.

21. A computer-readable storage medium carrying one or more sequences of instructions which, when executed by one or more processors, causes the one or more processors to perform the method recited in claim 5.

22. A computer-readable storage medium carrying one or more sequences of instructions which, when executed by one or more processors, causes the one or more processors to perform the method recited in claim 6.

23. A computer-readable storage medium carrying one or more sequences of instructions which, when executed by one or more processors, causes the one or more processors to perform the method recited in claim 7.

24. A computer-readable storage medium carrying one or more sequences of instructions which, when executed by one or more processors, causes the one or more processors to perform the method recited in claim 8.

25. A computer-readable storage medium carrying one or more sequences of instructions which, when executed by one or more processors, causes the one or more processors to perform the method recited in claim 9.

26. A computer-readable storage medium carrying one or more sequences of instructions which, when executed by one or more processors, causes the one or more processors to perform the method recited in claim 10.

27. A computer-readable storage medium carrying one or more sequences of instructions which, when executed by one or more processors, causes the one or more processors to perform the method recited in claim 11.

28. A computer-readable storage medium carrying one or more sequences of instructions which, when executed by one or more processors, causes the one or more processors to perform the method recited in claim 12.

29. A computer-readable storage medium carrying one or more sequences of instructions which, when executed by one or more processors, causes the one or more processors to perform the method recited in claim 13.

30. A computer-readable storage medium carrying one or more sequences of instructions which, when executed by one or more processors, causes the one or more processors to perform the method recited in claim 14.

31. A computer-readable storage medium carrying one or more sequences of instructions which, when executed by one or more processors, causes the one or more processors to perform the method recited in claim 15.

32. A computer-readable storage medium carrying one or more sequences of instructions which, when executed by one or more processors, causes the one or more processors to perform the method recited in claim 16.

* * * * *